United States Patent
Das et al.

(10) Patent No.: US 11,843,474 B2
(45) Date of Patent: *Dec. 12, 2023

(54) APPARATUS AND METHODS FOR PROVIDING HIGH-CAPACITY DATA SERVICES OVER A CONTENT DELIVERY NETWORK

(71) Applicant: Charter Communications Operating, LLC, St. Louis, MO (US)

(72) Inventors: Pratik Das, Centennial, CO (US); Diwelawatte Jayawardene, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 292 days.

This patent is subject to a terminal disclaimer.

(21) Appl. No.: 16/788,138

(22) Filed: Feb. 11, 2020

(65) Prior Publication Data

US 2021/0250196 A1 Aug. 12, 2021

(51) Int. Cl.
*H04L 12/28* (2006.01)
*H04W 84/18* (2009.01)
(Continued)

(52) U.S. Cl.
CPC ......... *H04L 12/2801* (2013.01); *H04W 16/14* (2013.01); *H04W 72/0453* (2013.01);
(Continued)

(58) Field of Classification Search
CPC .............. H04L 12/2801; H04W 16/14; H04W 72/0406; H04W 72/0453; H04W 84/042; H04W 84/18; H04W 88/06; H04W 72/20
See application file for complete search history.

(56) References Cited

U.S. PATENT DOCUMENTS 6,542,739 B1 4/2003 Garner
7,366,286 B1* 4/2008 Shenoi ................. H04M 11/062
379/93.08
(Continued)

FOREIGN PATENT DOCUMENTS

CN 105071860 A 11/2015
JP 2006325206 A 11/2006
(Continued)

OTHER PUBLICATIONS

FCC Consumer Guideline regarding signal leakage, printed Jan. 29, 2021 from https://www.fcc.gov/consumers/guides/cable-signal-leakage.
(Continued)

*Primary Examiner* — Jasper Kwoh
(74) *Attorney, Agent, or Firm* — Patent Beach PC

(57) ABSTRACT

Apparatus and methods for providing high-bandwidth, low-latency data service over a content delivery including existing wireline infrastructure. In one embodiment, a network architecture having service delivery over at least portions of extant hybrid fiber coax (HFC) infrastructure is disclosed, which includes standards-compliant ultra-low latency and high data rate services (e.g., 3GPP and IEEE Std. 802.11 services) via a common service provider. In one variant, an expanded frequency band (e.g., 1.6 GHz in total bandwidth) is used over the coaxial portions of the HFC infrastructure, which is allocated to two or more sub-bands. Wideband amplifier apparatus are used to support delivery of the sub-bands to CPE within the network.

20 Claims, 18 Drawing Sheets

(51) Int. Cl.
*H04W 72/0453* (2023.01)
*H04W 16/14* (2009.01)
*H04W 84/04* (2009.01)
*H04W 88/06* (2009.01)
*H04W 72/20* (2023.01)

(52) U.S. Cl.
CPC ......... *H04W 72/20* (2023.01); *H04W 84/042* (2013.01); *H04W 84/18* (2013.01); *H04W 88/06* (2013.01)

(56) References Cited

U.S. PATENT DOCUMENTS

| | | | |
|---|---|---|---|
| 7,581,012 B2 | 8/2009 | Shiouchi et al. | |
| 7,606,529 B1 | 10/2009 | Swan et al. | |
| 8,880,071 B2 | 11/2014 | Taaghol et al. | |
| 10,693,687 B1 | 6/2020 | Kushnir | |
| 10,742,270 B1 | 8/2020 | Kim | |
| 2004/0158649 A1 | 8/2004 | Ophir et al. | |
| 2004/0187156 A1 | 9/2004 | Palm et al. | |
| 2005/0034159 A1 | 2/2005 | Ophir et al. | |
| 2005/0063317 A1 | 3/2005 | Risberg et al. | |
| 2008/0101291 A1 | 5/2008 | Jiang et al. | |
| 2008/0279287 A1 | 11/2008 | Asahina | |
| 2009/0110088 A1* | 4/2009 | Di Giandomenico | H04L 12/2856 725/151 |
| 2009/0119735 A1* | 5/2009 | Dounaevski | H04N 7/17309 725/129 |
| 2009/0217326 A1 | 8/2009 | Hasek | |
| 2010/0064330 A1* | 3/2010 | Yu | H04L 27/0002 725/120 |
| 2012/0076009 A1 | 3/2012 | Pasko | |
| 2012/0083207 A1 | 4/2012 | Rofougaran et al. | |
| 2013/0010686 A1 | 1/2013 | Shatzkamer et al. | |
| 2013/0077554 A1 | 3/2013 | Gauvreau et al. | |
| 2013/0156115 A1 | 6/2013 | Petrovic | |
| 2013/0279914 A1 | 10/2013 | Brooks | |
| 2014/0148107 A1 | 5/2014 | Maltsev et al. | |
| 2015/0156777 A1 | 6/2015 | Negus et al. | |
| 2015/0181363 A1 | 6/2015 | Khorami | |
| 2016/0013855 A1 | 1/2016 | Campos et al. | |
| 2016/0021595 A1 | 1/2016 | Czaja et al. | |
| 2016/0073344 A1 | 3/2016 | Vutukuri et al. | |
| 2016/0094421 A1 | 3/2016 | Bali et al. | |
| 2016/0127434 A1* | 5/2016 | Yoon | H04L 65/4076 370/390 |
| 2016/0128072 A1 | 5/2016 | Rajagopal et al. | |
| 2016/0259923 A1 | 9/2016 | Papa et al. | |
| 2017/0093555 A1* | 3/2017 | Hamzeh | H04L 5/1469 |
| 2017/0118527 A1 | 4/2017 | Wachob et al. | |
| 2017/0164068 A1 | 6/2017 | Wachob et al. | |
| 2017/0245281 A1 | 8/2017 | Zuckerman et al. | |
| 2018/0146408 A1 | 5/2018 | Meylan et al. | |
| 2018/0167128 A1 | 6/2018 | Kinamon et al. | |
| 2018/0184337 A1 | 6/2018 | Jin et al. | |
| 2018/0213452 A1 | 7/2018 | Kim et al. | |
| 2018/0242327 A1 | 8/2018 | Frenne et al. | |
| 2018/0269974 A1 | 9/2018 | Luciano | |
| 2018/0343685 A1 | 11/2018 | Hart et al. | |
| 2018/0351809 A1 | 12/2018 | Meredith et al. | |
| 2019/0028141 A1* | 1/2019 | Padden | H04W 72/0453 |
| 2019/0037630 A1 | 1/2019 | Zhang et al. | |
| 2019/0109643 A1 | 4/2019 | Campos et al. | |
| 2019/0124572 A1 | 4/2019 | Park et al. | |
| 2019/0124696 A1 | 4/2019 | Islam et al. | |
| 2019/0229974 A1 | 7/2019 | Campos et al. | |
| 2019/0319814 A1 | 10/2019 | Das | |
| 2019/0319858 A1 | 10/2019 | Das et al. | |
| 2019/0320250 A1 | 10/2019 | Hoole et al. | |
| 2019/0320494 A1 | 10/2019 | Jayawardene et al. | |
| 2019/0334599 A1 | 10/2019 | Davydov | |
| 2019/0349848 A1 | 11/2019 | Bali | |
| 2019/0379455 A1 | 12/2019 | Wang et al. | |
| 2020/0112888 A1 | 4/2020 | Glennon et al. | |
| 2020/0119877 A1 | 4/2020 | Wang et al. | |
| 2020/0214065 A1 | 7/2020 | Tomala et al. | |
| 2021/0028915 A1 | 1/2021 | Jia et al. | |
| 2021/0112551 A1 | 4/2021 | Anderson et al. | |
| 2021/0175925 A1 | 6/2021 | Tarighat Mehrabani | |
| 2021/0176665 A1 | 6/2021 | Lan et al. | |
| 2021/0336815 A1 | 10/2021 | Das et al. | |
| 2021/0337543 A1 | 10/2021 | Das et al. | |
| 2021/0378039 A1 | 12/2021 | Cherian et al. | |
| 2021/0409979 A1 | 12/2021 | Wang et al. | |
| 2022/0039180 A1 | 2/2022 | Mukherjee et al. | |
| 2022/0078624 A1* | 3/2022 | Hong | H04W 74/0808 |
| 2022/0132524 A1* | 4/2022 | Mueck | H04W 4/44 |

FOREIGN PATENT DOCUMENTS

| | | |
|---|---|---|
| JP | 2011254495 A | 12/2011 |
| JP | 2016511998 A | 4/2016 |
| JP | 2017118483 A | 6/2017 |
| JP | 2018510589 A | 4/2018 |
| KR | 20160097917 A | 8/2016 |
| WO | WO-2004045125 A2 | 5/2004 |
| WO | WO-2015111767 A1 | 7/2015 |
| WO | WO-2015147707 A1 | 10/2015 |
| WO | WO-2020197452 A1 | 10/2020 |
| WO | WO-2020232461 A2 | 11/2020 |
| WO | WO-2021220624 A1 | 11/2021 |

OTHER PUBLICATIONS

Deering, S., et al., "Internet Protocol, Version 6 (IPv6) Specification", Internet Engineering Task Force (IETF), Dec. 1998, 39 pages.
IEEE Std. 802.11, 1997.
"Internet Protocol, DARPA Internet Program, Protocol Specification", IETF RCF 791, Sep. 1981, 50 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018.
Wi-Fi Direct (including "Wi-Fi Peer-to-Peer (P2P) Specification"), copyright 2014, Wi-Fi Alliance.
Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

\* cited by examiner

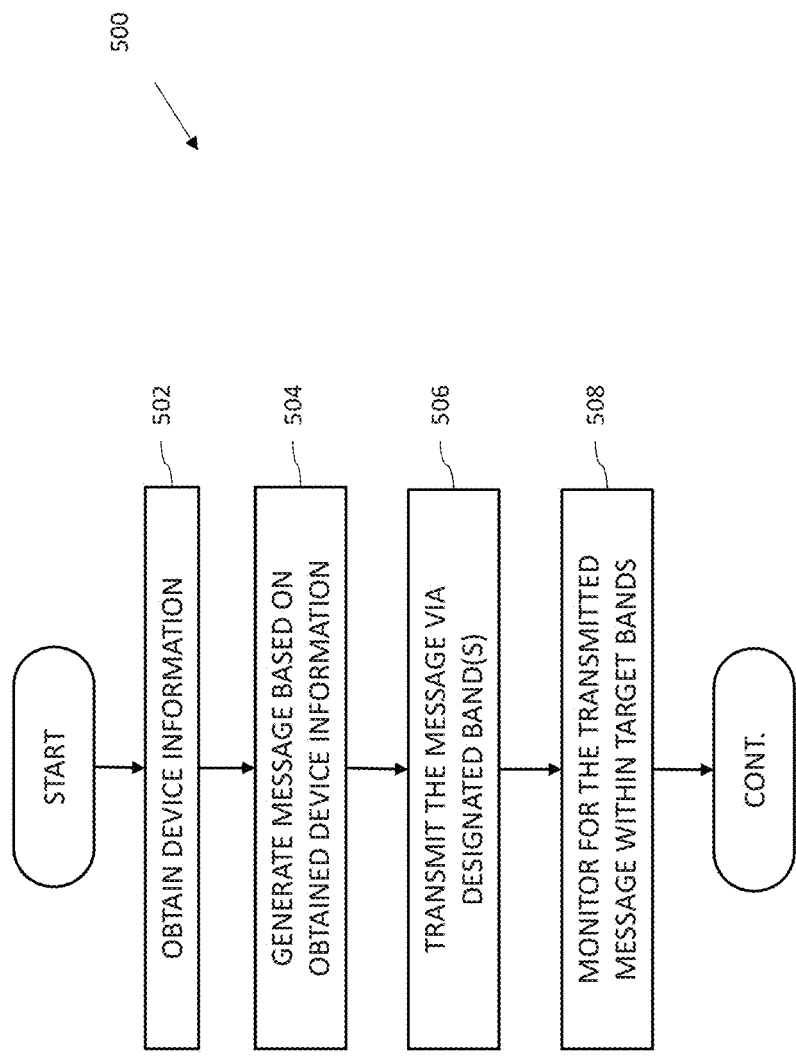

APPARATUS AND METHODS FOR PROVIDING HIGH-CAPACITY DATA SERVICES OVER A CONTENT DELIVERY NETWORK

RELATED APPLICATIONS

This application is generally related to the subject matter of co-owned U.S. Provisional Patent Application Ser. No. 62/658,465 filed Apr. 16, 2018 and entitled "APPARATUS AND METHODS FOR INTEGRATED HIGH-CAPACITY DATA AND WIRELESS NETWORK SERVICES", which is now published as U.S. Patent Application Publication No. 2019/0320322 of the same title filed Dec. 11, 2018, each of which is incorporated herein by reference in its entirety. This application is also generally related to the subject matter of co-pending U.S. patent application Ser. No. 16/261,234 filed Jan. 29, 2019 and entitled "APPARATUS AND METHODS FOR ENABLING MOBILITY OF A USER DEVICE IN AN ENHANCED WIRELESS NETWORK," Ser. No. 16/384,706 filed Apr. 15, 2019 and entitled "APPARATUS AND METHODS FOR COORDINATED DELIVERY OF MULTIPLE DATA CHANNELS OVER PHYSICAL MEDIUM," Ser. No. 16/384,561 filed Apr. 15, 2019 and entitled "APPARATUS AND METHODS FOR INTEGRATED HIGH-CAPACITY DATA AND WIRELESS IOT (INTERNET OF THINGS) SERVICES," Ser. No. 16/384,805 filed Apr. 15, 2019 and entitled "GATEWAY APPARATUS AND METHODS FOR WIRELESS IOT (INTERNET OF THINGS) SERVICES," and Ser. No. 16/384,701 filed Apr. 15, 2019 and entitled "APPARATUS AND METHODS FOR ENHANCING QUALITY OF EXPERIENCE FOR OVER-THE-TOP DATA SERVICES OVER HIGH-CAPACITY WIRELESS NETWORKS," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1 Technological Field

The present disclosure relates generally to the field of data networks and wireless devices, and specifically in one exemplary aspect to an architecture which provides high-speed data service in a content delivery network using, inter alia, wireless technology.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" delivery of third-party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere, anytime", so that users (subscribers) can access the desired services (e.g., watching a movie) via a number of different receiving and rendering platforms, such as in different rooms of their houses, on their mobile devices while traveling, etc.

Additionally, so-called "OTT" or over-the-top services such as Amazon or Netflix subscriptions are utilized by many individuals, as are cellular wireless voice and data services (e.g., those provided by mobile network operators or MNOs).

Most users also maintain wireless access points (e.g., IEEE Std. 802.11 compliant) within their premises to enable a variety of functions including use of mobile devices to watch content or access the Internet, view premises security system data or video, and control household automation functions (e.g., via IoT technology).

Issues with Existing Architecture and Services-

As user appetite for enhanced data rates, mobility and diversity of services has increased over time, service providers have sought new technologies and paradigms for service delivery to compensate. In the case of cable networks, only so much expansion or enhancement is possible under traditional technology models (e.g., use of 800 MHz of spectral bandwidth with limited upstream bandwidth, modulation schemes, DOCSIS protocols, etc.), and even where such enhancement is possible, significant capital and R&D (research and development) expenditures are required to upgrade or adapt these existing technologies and infrastructure to the new required levels of performance.

As a simple example of the foregoing, consider a multi-dwelling unit (MDU) served by an existing HFC network topology (see discussion of FIGS. 1 and 2 below). The network will typically utilize optical fiber to deliver data to a network node, which then converts the optical domain data to RF (radio frequency) signals for transmission over the existing coaxial cable distribution network and to the served customers at the edge of the network (including the aforementioned MDU, which as most legacy structures, is internally wired with coaxial cable serving each individual dwelling unit therein, with the owner of the MDU retaining ownership of the cable installed by the MSO and hence representing a "sunk cost" investment to the MSO). As customers demand increased levels of service (high data rates, more features, etc.) in order to maintain their loyalty/subscription in the face of competing services such as cellular data, fiber, satellite, etc., the cable MSO is often faced with the daunting prospect of upgrading the infrastructure serving such MDUs, which may include addition of fixed wireless access (FWA) infrastructure, replacing of miles of coaxial cable with optical fiber, and similar.

For instance, to achieve certain capacity targets (e.g., 10 Gbps) over such infrastructure, increased use of optical fiber is needed in certain parts of the infrastructure. Under current HFC network design, services are provided to users via a coaxial cable "drop" to their premises, and groups of such premises are served by common tap-off points or nodes within the larger architecture (see discussion of cable systems supra). Individual premises "tap off" the cabling or other infrastructure from each node and, depending on their geographic placement and other considerations, may require utilization of a number of different amplification units in order to maintain sufficient signal strength out to the most distant (topology-wise) premises in the system. For instance, a common description of how many amplifier stages are used between a source node and premises is "N+i", where i=the number of amplifier stages between the source node and the premises. For instance, N=0 refers to the situation where no amplifiers are used, and N+3 refers to use of three (3) amplifiers. In some extant cable/HFC systems in operation, values of i may be as high as seven (7); i.e., N+7, such as for service to rural areas.

As can be expected, use of such amplifier stages introduces some limitations on the data rates or bandwidth (both downstream—i.e., toward the client premises; and upstream—i.e., from the client premises) achievable by such systems. In effect, such systems are limited in maximum bandwidth/data rate, due in part to the design of the amplifiers; for example, they are typically designed to provide services primarily in the downstream direction (with much lower upstream bandwidth via so-called "OOB" or out-of-band RF channels providing highly limited upstream communication).

Cable modem or DOCSIS-compliant systems utilize DOCSIS QAMs (RF channels) for enhanced upstream bandwidth capability such as for Internet services, but even such technologies are in their current incarnations significantly limited in capability, and moreover have limited flexibility in the allocation of downstream versus upstream bandwidth, especially dynamically. For example, based on the DOCSIS protocols utilized for e.g., a coaxial infrastructure available in the aforementioned MDU served within a managed HFC network, throughput availability for downstream and upstream is in effect "hard-wired" based on how much of an available amount of spectrum is reserved for each direction. Because of this hard-wired availability, as well as the use of the aforementioned taps and amplifier stages, upstream throughput is limited in the foregoing HFC network.

As alluded to above, one way of achieving higher data rates may require replacement of such amplifier stages (and supporting coaxial cabling) with other mediums such as optical fiber (sometimes referred to as going "fiber deep", which can provide for example higher bandwidth, lower loss, and symmetric operation), microwave dishes at rooftop, and Ethernet cable (which can also provide symmetric operation), including going all the way back to an N+0 configuration throughout the entire network. However, replacement of literally tens of thousands of amplifiers and thousands of miles of cabling with optical fiber or the like is prohibitively expensive, and can take years.

Higher data rates may be achieved by implementation of DOCSIS 4.0 protocols; this version of the DOCSIS standard supports e.g., two (2) modes of use: (i) extended spectrum, without full duplex (which means separate allocation of downstream and upstream bandwidth, which can result in loss of capacity since the downstream and upstream bandwidth needs may not necessarily be static); and (ii) full duplex. Full duplex or symmetric DOCSIS 4.0, while providing significant enhancement over existing asymmetric DOCSIS systems, similarly requires significant capital investment and technology development, including relating to its supporting ecosystem (which in fact is one salient reason why the 4.0 standard also includes the first (i) mode described above, which in effect amounts to a legacy mode). The high implementation cost (including a long lead time) of continuous research and development for the newer developments in DOCSIS is moreover likely to persist, in part due to fragmented MSO selection of one of the aforementioned modes over the other.

Hence, replacing large portions of coaxial cable infrastructure with optical fiber, retrofitting to utilize the latest DOCSIS 4.0 technology, adding FWA for high-speed wireless backhaul, or other such upgrades to the existing MSO infrastructure represent (i) a huge CAPEX cost for the MSO (especially in dense urban environments with literally hundreds of closely spaced MDUs), and (ii) in some cases significant amounts of R&D for development of the necessary supporting ecosystem; these expenditures and development-induced latencies ideally would be at least partly avoided if somehow the extant HFC infrastructure could be enhanced or "repurposed" to include higher data rates, more symmetry between US and DS capability, and expanded types of services (such as mobility services).

Another issue to be addressed is the presence of delivered versus actual capacity "mismatch" with current systems. Even with delivery systems that currently provide a high degree of capability and symmetry (such as optical fiber), extant technologies for utilizing this delivered capacity symmetrically, and to its full capacity, are only now under development and not yet deployed. As such, even with a high US and DS capability available with e.g., optical fiber service, the end-user equipment such as 802.11ac routers can only utilize portions of this capability (and not nearly to its full capacity. Similarly, when considering a coaxial cable, it in theory can provide much higher data rates, and symmetrically, than current delivery paradigms such as DOCSIS 3.1 used by cable modems, and in-band 6 MHz channels (DS) used by DTSBs can provide. Hence, stated simply, the large existing inventory of coaxial cable is physically capable of much better performance than current protocols and end-user components can support.

Yet another issue facing service providers including cable MSOs is service fragmentation. Generally speaking, the average consumer (whether residential, enterprise, or other) maintains multiple separate service providers for different data/telecommunications/content services. For example a typical user might have a cellular subscription (e.g., via 3GPP LTE technology) with an MNO, cable television and high-speed broadband data subscriptions with an MSO, a security monitoring service or subscription with a third party provider, and so forth. The foregoing services are often not integrated or logically unified, and may require subscription to and use of multiple service provider technologies and infrastructure. For example, unlicensed WLAN APs within a user premises may be backhauled by a cable or fiber or satellite MSO, while cellular service is provided by a wholly separate MNO using licensed cellular infrastructure or via a femto/pico-cell at the end of the pipe between the MSO backhaul and CPE, which provides only a limited amount of capacity for cellular use.

Accordingly, improved apparatus and methods are needed to, inter alia, enable optimized delivery of ultra-high data rate services (both wired and wireless) symmetrically, and which leverage extant network infrastructure such as the large inventory of installed coaxial cable and supporting infrastructure in both MSO networks and the premises they serve. Ideally, such improved apparatus and methods would also support user multi-service integration (e.g., aggregation of mobile wireless, premises, and other services), and support incipient IoT applications and technologies.

SUMMARY

The present disclosure addresses the foregoing needs by providing, inter alia, apparatus and methods for delivering ultra-high data rate services (both wired and wireless) by leveraging extant network infrastructure via e.g., new wireless technology capabilities.

In a first aspect of the disclosure, apparatus and methods for delivery of high data rate service over an extant network infrastructure are disclosed. In one embodiment, the apparatus includes a network node and one or more complementary CPE in communication therewith via one or more amplifiers.

In one variant, the aforementioned network node includes optical and RF upstream ports, and one or more RF (e.g., 75 Ohm coaxial) downstream ports. In one variant, the node further includes high- and low-band RF chipsets (e.g., 802.11ax compliant), a plurality of frequency shifter apparatus, and an ISM-band transceiver.

In one embodiment, the aforementioned CPE apparatus includes an upstream RF (e.g., 75 Ohm coaxial) port, and a premises (DS) GbE port, as well as a plurality of wireless antennas capable of operation in desired frequency bands (e.g., those associated with 3GPP LTE or 5G NR bands, whether licensed or unlicensed/quasi-licensed).

In another aspect, a method of operating a radio frequency (RF) network is disclosed. In one embodiment, the operating is such that extant hybrid fiber coax (HFC) infrastructure is used to deliver broadband data services, and the method includes: transmitting from a first node one or more RF signals over at least one portion of coaxial cable infrastructure using at least one frequency band, the at least one frequency band wider in frequency range than an operating band of the coaxial cable infrastructure; receiving the transmitted one or more RF signals via at least one second node of the coaxial cable infrastructure; upconverting the received one or more RF signals via one or more modules to one or more user bands, the one or more user bands associated with the one or more modules; and transmitting the upconverted received one or more RF signals over at least one of (i) an air interface or (ii) a LAN, for consumption by a premises device associated with the CPE.

In one variant, the at least one frequency band is wider in frequency range than an operating band of the coaxial cable infrastructure when used for traditional cable operations. In one implementation, the at least one frequency band includes a band at least 1200 MHz in width.

In another implementation, the at least one frequency band includes a first band at least 600 MHz in width, and a second band at least 600 MHz in width, and the at least one frequency band further includes an ISM (Industrial Scientific Medical) band at least 10 MHz in width, the ISM band separate from the first band and the second band.

In yet another implementation, the first band and the second band are configured for use in either upstream (US) or downstream (DS) directions, and the method further includes dynamically reallocating at least portions of at least one of the first band or second band between said US or DS directions.

In another variant, the up-converting to one or more user bands includes up-converting to one or more 3GPP (Third Generation Partnership Project) Long Term Evolution (LTE) or 5G New Radio (NR) bands; and the transmitting includes transmitting over an air interface compliant with 3GPP LTE or 5G NR protocols within the one or more 3GPP licensed bands.

In a further variant, the up-converting to one or more user bands includes up-converting to one or more Citizens Broadband Radio Service (CBRS) unlicensed or quasi-licensed bands; and the transmitting includes transmitting over an air interface compliant with 3GPP (Third Generation Partnership Project) Long Term Evolution (LTE) or 5G New Radio (NR) protocols within the one or more CBRS unlicensed or quasi-licensed bands.

In another aspect of the disclosure, node apparatus for use within a hybrid network topology is disclosed. In one embodiment, the node apparatus includes: a first port for interfacing with a first portion of the network topology using at least a first type of network medium for data transmission; first network interface logic in communication with the first port; at least one RF integrated circuit in data communication with the first network interface logic, the at least one RF integrated circuit configured to at least generate RF waveforms within a prescribed frequency band; frequency shifter apparatus configured to shift the RF waveforms within the prescribed frequency band to a frequency lower than the prescribed frequency band; amplification logic configured to amplify the shifted RF waveforms; and a second port for interfacing with a second portion of the network topology using at least a second type of network medium for data transmission, the second port in communication with the amplification logic.

In one variant, the first portion of the network topology includes a fiber-optic distribution portion of the network topology, and the second portion includes a coaxial cable portion of the network topology, and the network topology includes a hybrid fiber coaxial (HFC) cable television network topology operated by a multiple systems operator (MSO).

In another variant, the amplification logic includes: a plurality of bid-directional amplifier apparatus; a plurality of signal splitting apparatus; and a plurality of diplexer apparatus.

In a further variant, the at least one RF integrated circuit includes two IEEE-Std. 802.11ax compliant ICs or chipsets, a first of the two ICs or chipsets configured to generate at least part of the RF waveforms within a first sub-band of the prescribed frequency band, and a second of the two ICs or chipsets configured to generate at least part of the RF waveforms within a second sub-band of the prescribed frequency band, the first and second sub-bands being non-overlapping in frequency.

In one implementation, the first of the two ICs or chipsets are configured to generate the at least part of the RF waveforms within the first sub-band for output via four (4) first ports or spatial diversity channels, and the second of the two ICs or chipsets are configured to generate the at least part of the RF waveforms within the second sub-band for output via four (4) second ports or spatial diversity channels.

In another implementation, the node apparatus further includes an RF waveform IC, wherein the RF waveform IC is configured to generate a plurality of RF waveforms with a cellular frequency band. The plurality of RF waveforms within the cellular frequency band are for instance coupled to the second port via a signal path comprising at least a second frequency shifter apparatus and at least a portion of the amplification logic, and the second frequency shifter apparatus is configured to shift the RF waveforms within the cellular band to a third sub-band within the prescribed frequency band.

In another aspect of the disclosure, user premises apparatus for use within a hybrid network topology is described. In one embodiment, the user premises apparatus includes: a first port for interfacing with a first portion of the network topology using at least a first type of network medium for transmission of signals; amplification logic in communication with the first port and configured to at least amplify signals received via the first port; frequency shifter apparatus configured to up-convert at least a portion of the amplified received signals to a prescribed frequency band; at least one RF integrated circuit (IC) configured to at least receive signals within the prescribed frequency band and convert them to data packets consistent with a data networking protocol; and switch apparatus configured to selectively switch the up-converted amplified received signals to at least two ports of the RF IC.

In one variant, the first port includes a coaxial cable port, the first portion includes a coaxial cable distribution plant, and the signals comprise radio frequency (RF) signals; and the at least one RF integrated circuit (IC) configured to at least receive signals within the prescribed frequency band and convert them to data packets consistent with a data networking protocol includes a chipset configured to receive RF signals within a prescribed wireless LAN (WLAN) frequency band, and to convert them to Ethernet data packets for distribution within the premises via an Ethernet-enabled network interface.

In one implementation, the user premises apparatus, further includes: at least one second frequency shifter apparatus configured to up-convert at least a portion of the amplified received signals to a prescribed cellular frequency band; and antenna apparatus in signal communication with the at least one second frequency shifter apparatus and configured to at least transmit the amplified received signals within the prescribed cellular frequency band within the premises.

In another aspect, a matrix apparatus is disclosed. In one embodiment, the matrix apparatus is used within the aforementioned CPE apparatus to implement allocation or switching between different signals of the CPE chipsets (e.g., 802.11ax chipsets). In one variant, the matric apparatus includes Butler matrix logic. In one implementation, the matrix logic is controlled by an upstream controller process (e.g. at an upstream amplifier, node, or the headend of an MSO network). In another variant, the matrix logic is controlled locally such as a local controller process operative within one or more of the CPE at a served premises (e.g., MDU).

In another aspect, a method of controlling two or more CPE so as to collectively utilize available bandwidth resources is disclosed. In one embodiment, the CPE are each configured to utilize high-bandwidth chipsets (e.g., 802.11ax APs) and share available bandwidth on a common coaxial cable backhaul according to a frequency division scheme that is controlled by switching logic associated with the network. In one variant, the control of the switching operations is accomplished via transmissions of control information on the coaxial cable via an ISM band frequency band.

In another aspect, a frequency plan for use on a hybrid fiber/optical network is disclosed. In one embodiment, the frequency plan includes a total available spectrum of greater than 1 GHz (e.g., approximately 1.6 GHz in total), with high-speed symmetric US and DS capability, as well as utilization of portions of the available spectrum for cellular (e.g., 3GPP 4G or 5G) service, and for ISM-band (e.g., 900 MHz) communications. In one variant, the extant capability of IEEE Std. 802.11ax devices (e.g., chipsets) for 160 MHz channel bandwidth is used to generate two approximately 640 MHZ-wide sub-bands each with four (4) 160 MHz channels which can be independent allocated to different users, and to different delivery directions (i.e., US or DS). Hence, in one model, a single user can be allocated up to 2.4 GBps of capacity in either the US or DS (using one of the four 160 MHz channels in a given sub-band), or even higher using two or more 160 MHz channels bonded together), or lesser amounts based on e.g., demand.

In another aspect, apparatus and methods for converting optical input to coaxial output are disclosed.

In a further aspect, apparatus and methods for delivering mobility service through an extant network infrastructure without interfering with broadband data service are disclosed.

In another aspect, apparatus and methods for delivery of dynamically allocable and symmetric (US and DS) Gigabit data rate services are disclosed.

In yet an additional aspect, apparatus and methods for utilization of technology adapted for a first wireless paradigm to a wired paradigm (e.g., WLAN 802.11ax technology onto an extant HFC network infrastructure) are disclosed.

In yet another aspect, apparatus and methods for aligning or reconciling disparities between a technology used to deliver broadband data to the customer's premises with a technology used by customers to consume the broadband data are disclosed.

In another aspect, apparatus and methods for enabling transmission of cellular technology (e.g., 4G-LTE/5G-NR) with unlicensed (e.g., NR-U, LTE-LAA, or LTE-U) or quasi-licensed spectrum (e.g., CBRS) are disclosed.

In a further aspect, apparatus and methods for providing local outdoor AP functionality via a node is disclosed. In one embodiment, the apparatus and methods utilize a secondary band of wireless chipset capability (e.g., 2.4 GHz) for providing the outdoor capability via antenna mounted on the node, the node mounted or disposed in e.g., a publicly accessible place. In one variant, MSO subscribers are given sole access or priority of use of the ad hoc outdoor WLAN capability.

In another aspect, methods of retaining value of an MSO infrastructure investment are disclosed. In one embodiment, the methods include repurposing uses of an existing coaxial cable installed base (such as in an MDU) so as to extend its useable lifetime and at least delay (if not obviate) its replacement.

In a further aspect, apparatus and methods for shifting a frequency of LBT signal are disclosed.

In yet an additional aspect, apparatus and methods for shifting a frequency of TDD signal are disclosed.

In an additional aspect, apparatus and methods for shifting frequency of an FDD signal are disclosed.

In a further aspect, apparatus and methods for generating or obtaining node information are disclosed.

In yet an additional aspect, apparatus and methods for encoding data (e.g., ASCII characters) for node information onto an RF signal are disclosed.

In an additional aspect, apparatus and methods for communicating via ISM band are disclosed.

In an additional aspect, apparatus and methods for splitting and combining power and signals onto a coaxial cable are disclosed.

In a further aspect, apparatus and methods for communicating with an external cellular source are disclosed.

In another aspect, apparatus and methods for providing Wi-Fi AP service are disclosed.

In an additional aspect, apparatus and methods for providing cellular service within a premises are disclosed. In one embodiment, the apparatus and methods use a 5-85 MHz band for provision of the cellular data service, and utilize a CPE as a DAS (distributed antenna system) for transmission/reception of e.g., 3GPP waveforms to the premises via the coaxial cable serving the premises.

In yet an additional aspect, apparatus and methods for amplifying RF signals are disclosed. In one embodiment, the apparatus includes a plurality of diplexer stages coupled between coaxial (e.g., 75 Ohm) upstream and downstream ports, as well as bidirectional amplifiers, signal couplers, a power converter, and controller logic. In one variant, the amplifier apparatus further includes an ISM-band transceiver.

In another aspect, apparatus and methods for using a controlling entity to control a switch for mapping inputs of signals from a Wi-Fi AP onto ports of a Wi-Fi STA are disclosed.

In yet an additional aspect, a network architecture implementing one or more of the foregoing aspects of the disclosure are disclosed.

In yet an additional aspect, a software architecture implementing one or more of the foregoing aspects of the disclosure are disclosed.

In a further aspect, a frequency shifting architecture is disclosed. In one embodiment, the architecture includes a plurality of frequency shifters to accommodate two or more different multiple access schemes and associated frequency bands. In one variant, a first set of shifters is utilized in conjunction with an 802.11 chipset (operating via LBT and/or CSMA/CD protocols), while a second set of shifters is used in conjunction with a 3GPP chipset (operating via FDD or TDD protocols).

In a further aspect, an upstream/downstream diplexer and bi-directional amplifier architecture and method of duplexing/amplifying signals are disclosed. In one embodiment, the methods and architecture make use of (i) a tiered configuration of diplexers, and (ii) separate bidirectional amplifier configurations for different types of signals being propagated on the cable medium (e.g., WLAN and 3GPP having different multiple access protocols). In one variant, each "leg" of the architecture also includes a dedicated balun (balancer/unbalancer) and splitter circuit to enable communication of signals In another aspect, methods and apparatus for controlling two or more client devices so as to enable utilization of a common bearer medium is disclosed. In one embodiment, the methods and apparatus include use of a controller entity which coordinates switching components within the respective client devices so as to access waveforms associated with different spatial diversity channels encoded on a coaxial cable bearer so as to optimize data rates to each of the different client devices.

In another aspect, an optical to coaxial cable transducer that can transmit and receive IEEE Std. 802.11 and 3GPP 4G LTE and 5G NR waveforms to multiple CPE through a single coaxial cable is disclosed.

In a further aspect, a wireless access node is disclosed. In one embodiment, the node includes a computer program operative to execute on a digital processor apparatus, and configured to, when executed, obtain data from a control entity with which the node is associated, and based on the data, implement one or more functionalities (e.g., CPE configuration control, switch matrix control for allocating resources between two or more CPE, etc.).

In still a further aspect of the disclosure, a method for providing ad hoc mobile device broadband is described. In one embodiment, the method includes providing wireless coverage via one or more external (e.g., pole mounted) access nodes.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

In a further aspect, an optical-to-coaxial cable transducer that can transmit and receive 3GPP 4G LTE and 5G NR waveforms to multiple CPE through a single coaxial cable interface is disclosed.

In a further aspect, a method of introducing expanded data network services within a network infrastructure are disclosed. In one embodiment, the network includes an HFC cable network.

These and other aspects shall become apparent when considered in light of the disclosure provided herein.

BRIEF DESCRIPTION OF THE DRAWINGS

FIG. 5 is a logical flow diagram of an exemplary embodiment of a generalized method for RF communication via ISM band, useful with various aspects of the present disclosure.

Figure 1A:
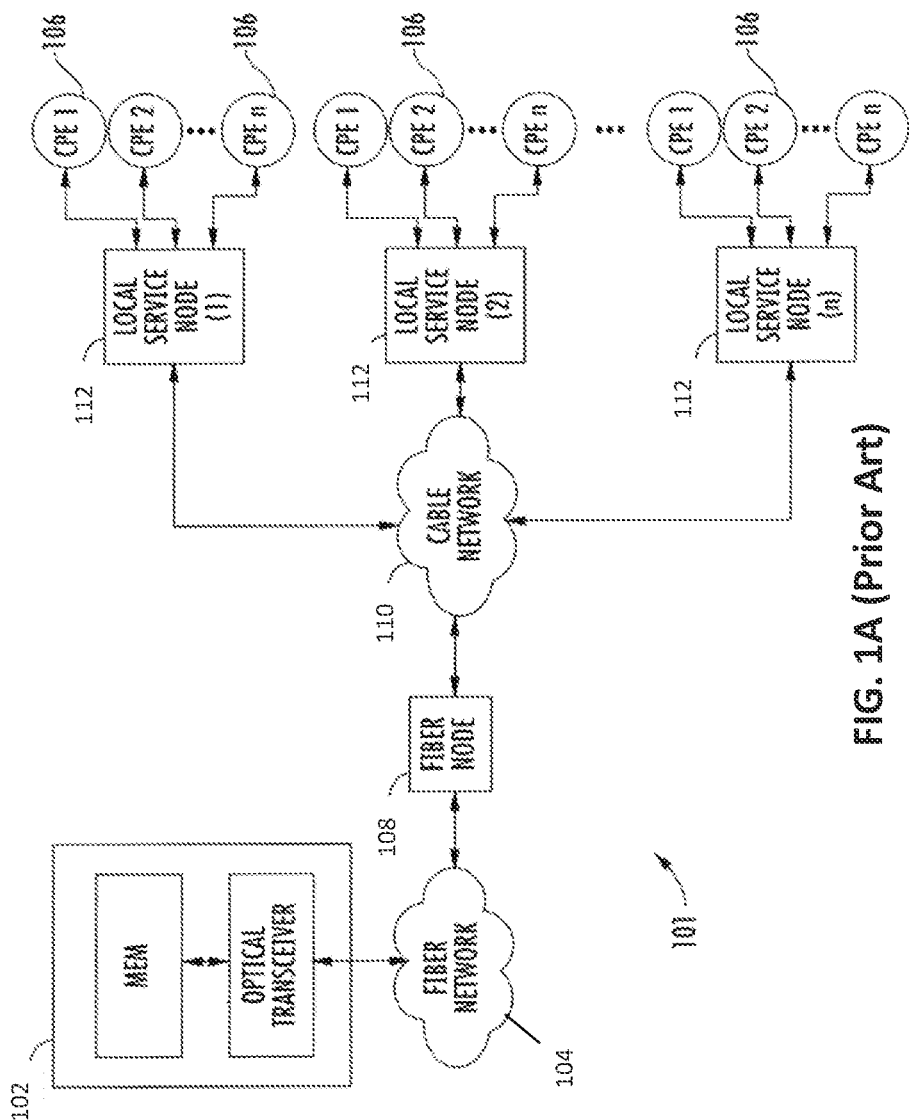
FIGS. 1A and 1B are functional block diagrams illustrating a typical prior art managed (e.g., HFC cable) content delivery network architecture.

All Figures© Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)— Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOC SIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/ FPMS, RLDRAM, SRAM, "flash" memory (e.g., NAND/ NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CB SD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ba or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3GPP/3GPP2, HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eUTRAN) and gNBs (5G NR).

Overview

In one exemplary aspect, the present disclosure provides improved architectures, methods and apparatus for providing enhanced ultra-high data rate services which, inter alia, leverage existing managed network (e.g., cable network) infrastructure. Advantageously, the disclosed architectural components (nodes, amplifiers and counterpart CPE) can be utilized in a variety of topologies, with network nodes disposed so as to support multiple downstream CPE including e.g., wherever an optical waveform is to be converted to a signal to be transmitted via coaxial cable. For instance, in one configuration, a node may be used further back towards the service provider core, such as to support a number of individual customer premises (e.g., homes) served by coaxial cable infrastructure. In another configuration, the node may be used at the very edge of the network to service a number of customers within a residential multi-dwelling unit or MDU (e.g., apartment building or condominium complex), that is wired with coaxial cable yet served by a proximate fiber drop (e.g., FTTC). Numerous other configurations are possible.

In one embodiment of the architecture, a Hybrid Fiber Coax (HFC) plant infrastructure and 802.11ax (colloquially termed "Wi-Fi 6") protocols are used as bases for provision of standards-compliant ultra-low latency and high data rate services (e.g., with capabilities associated with 3GPP 4G and 5G, and IEEE Std. 802.11 services based on 802.11ax technology). These services may include symmetric or asymmetric US and DS bandwidth which can be dynamically allocated, flexible scheduling of data to e.g., prioritize real-time data over non-real-time data), and support of cellular, WLAN and PAN (e.g., IoT) services, all via a common service provider. The exemplary use of Wi-Fi 6 technology provides not only the capability for symmetric operation of downstream (DS) and upstream (US) transmissions but also a symmetric capacity, which may not be possible with e.g., use of an 802.11ac router backhauled by DOCSIS.

In one variant, an expanded frequency band (approximately 1.6 GHz in total bandwidth) is used over the coaxial portions of the HFC infrastructure. This expanded band is allocated to two or more primary data sub-bands, as well as to ISM and cellular uses. Wideband amplifier apparatus are used to support DS and US utilization of the sub-bands within the network, including by premises devices via re-use of coaxial infrastructure. This allows the entity that installed such coaxial infrastructure to maintain its footprint in its customer's premises and continue to provide additional services without laying any significant amounts of optical fiber or other such alternate solutions.

In another variant, the use of 802.11ax APs for delivery of ultra-high data rate services allow e.g., 4.8 Gbps data rate services, which can allow for example two (2) users to take advantage of 2.4 Gbps data rate in parallel (instead of allowing one (1) user to get all of 4.8 Gbps due to silicon limitation). In another variant, a plurality of access and modulation scheme, such as an OFDM and TDD/FDD/LBT-based scheme is used to allow for maximal efficiency and flexibility in allocating bandwidth to downstream and upstream transmissions over the HFC infrastructure.

Moreover, latency within the disclosed infrastructure is reduced by, inter alia, obviating encapsulation and other network/transport protocols normally necessitated through use of e.g., DOCSIS bearers and equipment (i.e., DOCSIS modems and CMTS apparatus within the MSO core.

Using Wi-Fi protocols such as 802.11ax through HFC also enables broadband service benefits stemming from the rich feature set, vendor diversity and operational reliability that Wi-Fi ecosystem (which is being innovated at a high frequency) has already developed for a multitude of users of Wi-Fi technology in various devices. Furthermore, the exemplary embodiments can help streamline the delivery of broadband services (including increased service velocity) and the roadmap for service improvement by aligning the technology used to deliver broadband data to the customers' premises with the technology used by customers to consume the broadband data (e.g., Wi-Fi).

The improved architecture also advantageously facilitates mobility support by repurposing one or more spectrum (e.g., 5-85 MHz) typically used as upstream spectrum for DOCSIS for cellular signal extension and distribution (including both at the intermediary network nodes and the end-user's CPE).

Detailed Description of Exemplary Embodiments

Exemplary embodiments of the apparatus and methods of the present disclosure are now described in detail. While these exemplary embodiments are described in the context of the previously mentioned HFC cable system adapted for use with 802.11ax and 3GPP technology, and network nodes and CPE associated with or supported at least in part by a managed network of a service provider (e.g., MSO), other types of radio access technologies ("RATs"), and other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses.

Also, while certain aspects are described primarily in the context of the well-known Internet Protocol (described in, inter alia, *Internet Protocol DARPA Internet Program Protocol Specification*, IETF RCF 791 (Sept. 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Exemplary Network Architecture-

As a preliminary matter, it is useful to understand extant cable system topology and operation so that the various aspects of the present disclosure may be more clearly distinguished and contrasted.

Figure 1B:
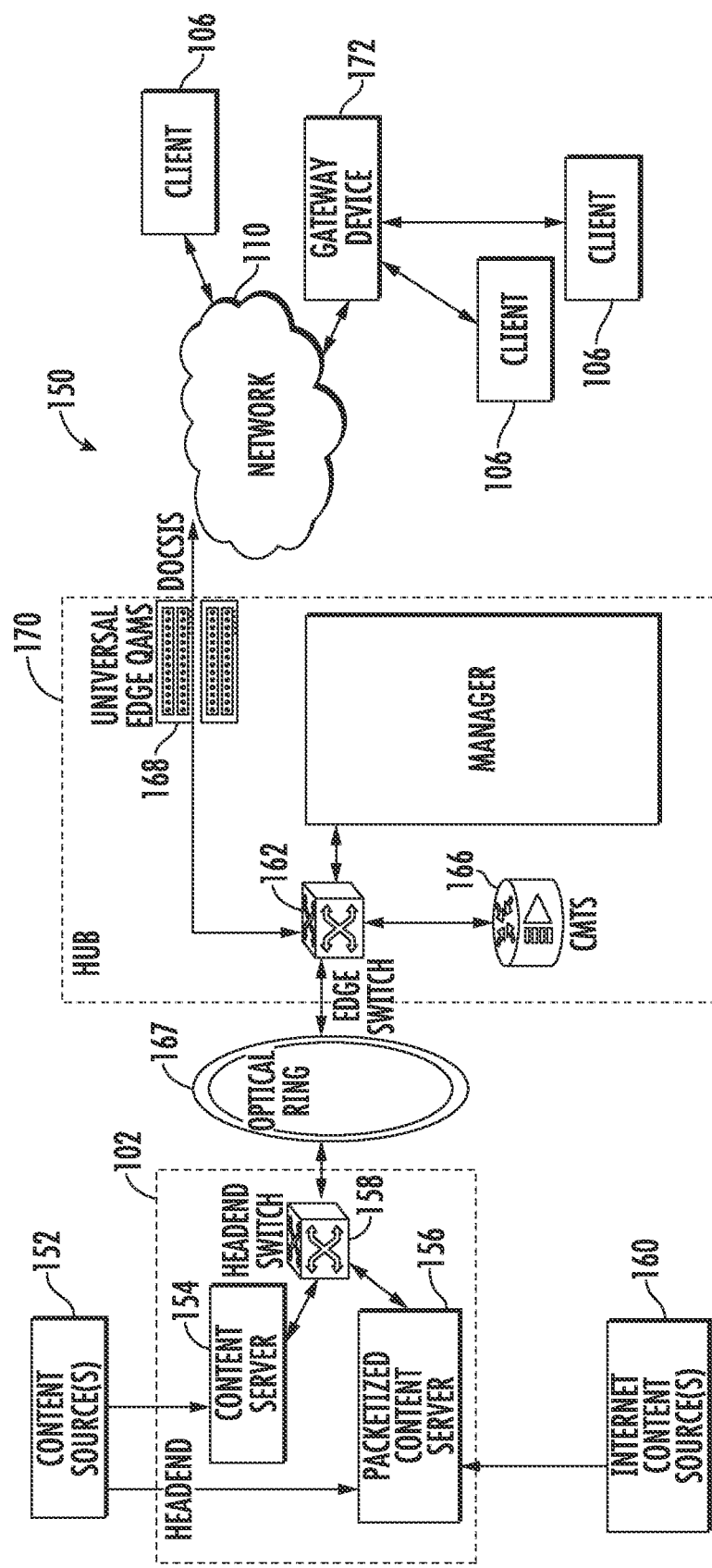
Figure 2:
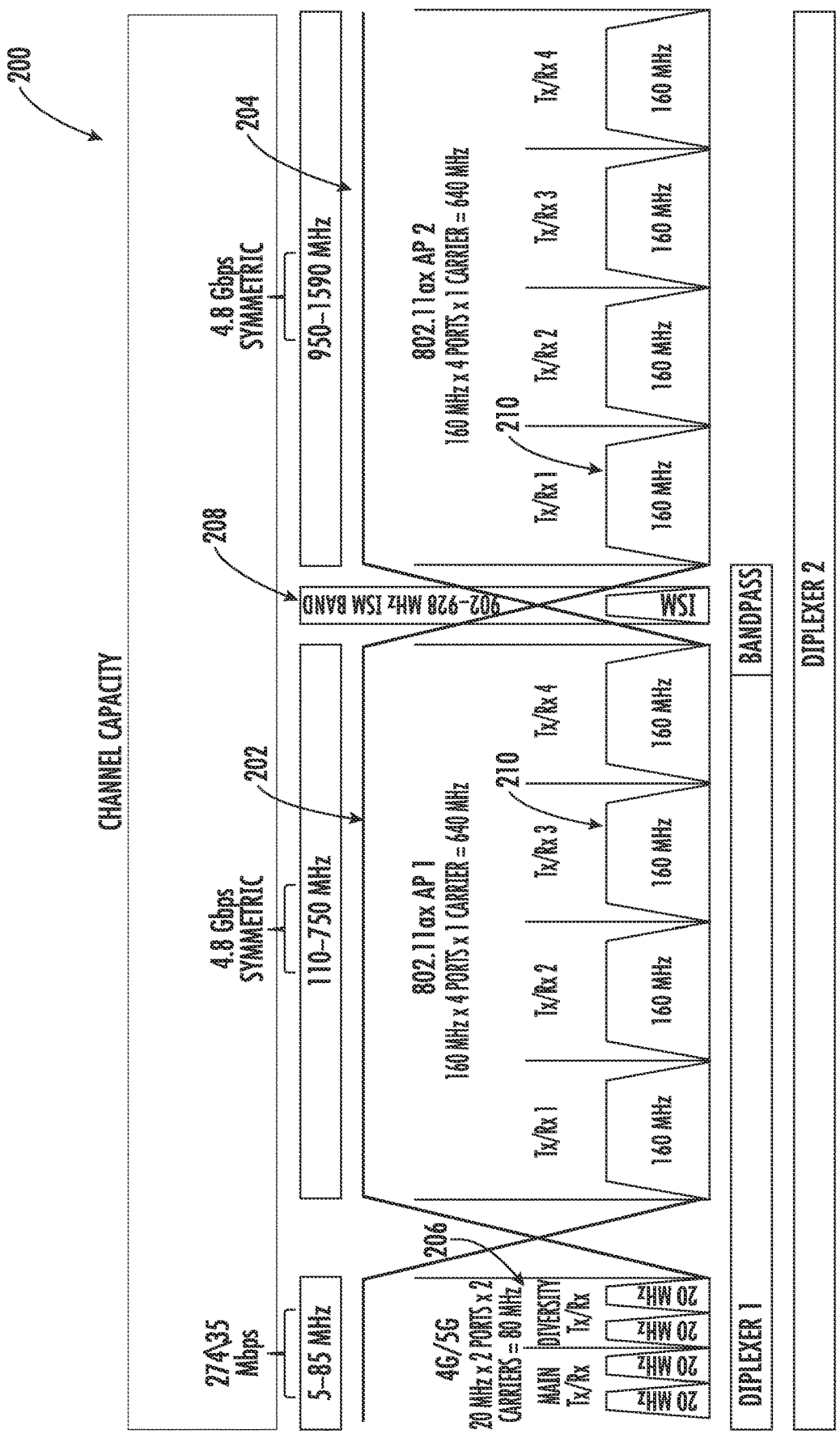
FIG. 2 is a graphical representation of an exemplary frequency band functional assignment according to one embodiment of the present disclosure.

Under existing paradigms, network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are functional block diagrams illustrating a typical prior art managed (e.g., HFC) content delivery network architecture used to provide such data services.

In such networks, data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via their hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), transmitted via e.g., statistical multiplex into a multi-program transport stream (MPTS) on 6 MHz radio frequency (RF) channels for receipt by the subscribers via RF tuners, de-multiplexed and decoded, and rendered on the users' rendering devices (e.g., digital TV) according to the prescribed coding format.

Within the cable plant, VOD and so-called switched digital video (SDV) may also be used to provide content, and via utilization of a single-program transport stream (SPTS) delivery modality. In U. S. cable systems for example, downstream RF channels used for transmission of television programs are 6 MHz wide, and occupy a multitude of 6-MHz spectral slots between 54 MHz and 860 MHz. Upstream and "out of band" communications are normally relegated to the lower end of the available spectrum, such as between 5 and 85 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using a Quadrature Amplitude Modulation (QAM) scheme, available payload bitrate for typical modulation rates (e.g., QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel ($10\times3.75=37.5$ Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as transmission of SD signals. For an exemplary MPEG-2

Main Profile—High Level (MP@HL) video compression, each HD program requires around 15-Mbps bitrate.

Hence, in sum, existing cable systems utilize what in effect amounts to an FDM system with 6 MHz channels and roughly 700 MHz of available bandwidth capacity in total, each of the channels being QAM modulated and delivered to the end user via e.g., a tree-and-branch type of topology, with user's CPE (e.g., digital settop boxes, DOCSIS modems, and gateways) utilizing RF tuners to tune to the appropriate DS channels to receive their respective data or program streams. As previously noted, this approach has limitations on its capacity, and hence can only be expanded so far in terms of available bandwidth (both DS and US), and serving additional customers with additional services.

Accordingly, a new model is needed. As shown in the exemplary frequency plan 200 of FIG. 2, various embodiments of the present disclosure utilize two bands 202, 204 each comprised of four (4) 160-MHz-wide channels 210, the two bands as supported by each of two (2) 802.11ax-based APs (see discussion of FIGS. 7-7B infra), can each provide a symmetric data service at the rate of 4.8 Gbps. Due to extant silicon limitations in current 802.11ax chipsets as of the date of this disclosure, the entirety of the 4.8 Gbps bandwidth cannot be allocate to a single user; however, such capability is incipient, and the present disclosure explicitly contemplates such configurations. However, even under the existing silicon, two (2) users can each utilize up to 2.4 Gbps in parallel. Therefore, the two (2) 802.11ax APs can provide a very high data rate service by utilizing the two sets of four (4) 160-MHz channels.

Moreover, the frequency use plan 200 of FIG. 2 includes provision for other functions (in addition to symmetric or asymmetric primary band uses), including support of cellular waveforms provided via 5-85 MHz band 206 (which as noted previously is generally used for upstream data communication for DOCSIS or OOB communication in traditional cable systems), as well as data communication via one or more ISM bands 208 (e.g., at 902-928 MHz).

As will be described in greater detail below, the cellular band(s) 206 can support transmission of e.g., 3GPP 4G/4.5G/5G waveforms to and from the customer's premises, in effect making the MSO's system a huge DAS (distributed antenna system) for a cellular operator or MNO, or even the MSO itself when acting as a wireless service provider. For instance, in one such model, the MSO may use 3GPP-based technology as an underpinning for providing unlicensed or quasi-licensed service via e.g., NR-U bands, CBRS bands, C-Band, or even mmWave bands to its users or subscribers.

Similarly, the ISM band(s) 210 within the frequency plan 200 provide a number of different functions to aid in, among other things, CPE control and fault detection by the MSO.

As shown in FIG. 2, the overall spectrum utilized by the plan 200 is on the order of 1.6 GHz, roughly twice that of a typical MSO cable band under the prior art. Notably, the portions of the extant HFC architecture leveraged as part of the architectures of the present disclosure are not inherently limited by their medium and architecture (i.e., optical fiber transport ring, with coaxial cable toward the edges); coaxial cable can operate at frequencies significantly higher than the sub-1 GHz typically used in cable systems, and such additional bandwidth is made use of in the exemplary embodiments described herein.

It will also be appreciated that the attenuation described above is a function of, inter alia, coaxial conductor length, and hence higher levels of "per-MHz" attenuation may be acceptable for shorter runs of cable. Stated differently, nodes servicing (or serviced by) shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure also contemplates embodiments which make use of selective mapping of frequency spectrum usage as a function of total cable medium run length or similar.

Accordingly, referring now to FIGS. 3A-3D, various embodiments of an enhanced service provider (e.g., cable MSO) network architecture making use of the exemplary frequency plan of FIG. 200 are shown and described in detail. As described in greater detail subsequently herein, each of the architectures 300, 320, 340 of FIGS. 3A-3D make use of an existing, developed technology "ecosystem" as a basis of its new data and signal processing and delivery capabilities (in both DS and US directions). This use of much of the existing "last mile" of infrastructure, and existing high-performance wireless components, advantageously obviates much of the previously discussed long development cycles and R&D costs associated with developing components from "the ground up," and accordingly each greatly enhances customer service velocity (i.e., the rate at which new services and capabilities can be added to the system) as well as customer satisfaction and loyalty.

Figure 3A:
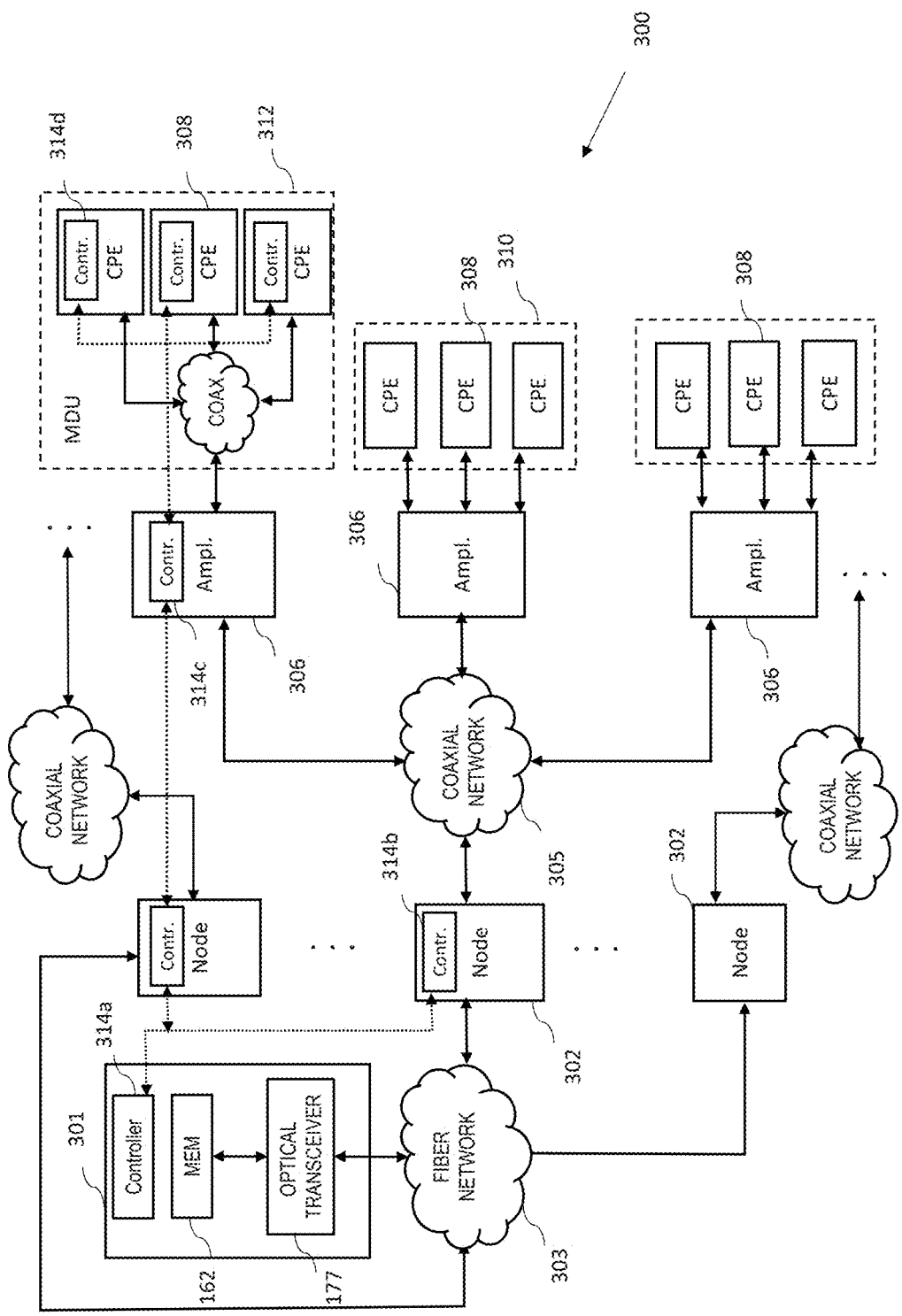
FIG. 3A is a functional block diagram illustrating a first exemplary embodiment of a service provider network architecture according to the present disclosure.

In a first embodiment illustrated in FIG. 3A, the improved network architecture 300 according to the present disclosure includes a headend 150, optical fiber distribution network 303 (e.g., DWDM ring or similar), and a plurality network nodes 302 connected to the network/ring 303 within the MSO network (such nodes which may be e.g., near edge portions of the network, or further towards the core, depending on configuration and the particular portions of the network served). Furthermore, the architecture 300 also includes a plurality of amplifiers 306, which are used to compensate for transmission losses due to the coaxial medium 305 by amplifying the signal in the downstream and upstream directions as required. The architecture 300 also includes a multitude of served CPE 308, which are used to process and transmit signals to end users as described in greater detail below.

As shown in FIG. 3A, in one embodiment of the network architecture 300, the network nodes 302 are backhauled by optical fiber, although this is merely illustrative, as other types of backhauls may be used (e.g., RF wireless such as mmWave systems, or Metro Ethernet with twisted copper).

Also included in the architecture 300 of FIG. 3A are controller entities or processes 314a, 314b, 314c which are in logical communication with one another via e.g., the distribution network architecture. As described in greater detail below, these controller processes enable, inter alia, control by a headend controller 314a of the nodes and amplifiers for configuration and re-configuration of the devices during operation, such as to reallocate frequency spectrum, change modulation/coding schemes (MCS) on the various devices, and enable ISM-band based functionality.

Returning to FIG. 3A, a plurality of taps (not shown) and the amplifiers 306 are utilized to distribute signals to the multitude of CPE 308, which may be disposed as groups of individual premises/customers 310 with respective CPE 308 served by a given amplifier and "branch" of the coaxial topology, or alternatively as groups of CPE 308 within aggregated premises such as MDUs, enterprise or educational campuses or similar 312. As shown, in the case of the MDUs/campuses 312, the target premises includes an indigenous coaxial cable network (whether star, tree, or other topology), such as may have been installed at time of construction of the building(s) served. It will be appreciated that any number and topology of network nodes 302, taps, amplifiers 306, and CPE 308 can be used to deliver high-capacity data services to the CPE 308 that are disposed at customer premises of residential customers as well as enterprise, educational, government/military, or other types customers.

The MSO network architecture 300 of FIG. 3 is particularly useful for the delivery of packetized content (e.g., encoded digital content carried within a packet or frame structure or protocol) consistent with the various aspects of the present disclosure. In addition to on-demand and broadcast content (e.g., live or "linear" video programming), the system of FIG. 3 can deliver and receive Internet data and OTT (over-the-top) services to the end users via the Internet protocol (IP), although other protocols and transport mechanisms of the type well known in the digital communication art may be substituted. Moreover, as discussed in greater detail below, the architecture also includes provision for cellular service, ISM band service, and WLAN backhaul, as well as supporting low-latency functionality of the user such as distributed gaming and AR/VR application support.

The architecture 300 of FIG. 3 further provides a consistent and seamless user experience with IPTV or streaming media over both wireline and wireless interfaces. Additionally, in the IP paradigm, dynamic switching between unicast delivery and multicast/broadcast can be used based on e.g., local demand. For instance, where a single user (device) is requesting content, an IP unicast can be utilized. For multiple devices (i.e., with multiple different IP addresses, such as e.g., different premises), multicast can be utilized where similar content is delivered. This approach provides for efficient and responsive switching of delivery and obviates other more equipment/CAPEX-intensive approaches.

Moreover, the architecture can be used for both broadband ("Internet") data delivery as well as simultaneous delivery of "content" (e.g., movie channels), and obviates much of the need for a separate infrastructure for "in band" and DOCSIS (and "out of band" (OOB)) transport.

In certain embodiments, the service provider network 300 also advantageously permits the aggregation and/or analysis of subscriber- or account-specific data. As but one example, device-specific IDs can be cross-correlated to MSO subscriber data maintained at e.g., the network head ends (not shown) so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

Figure 3B:
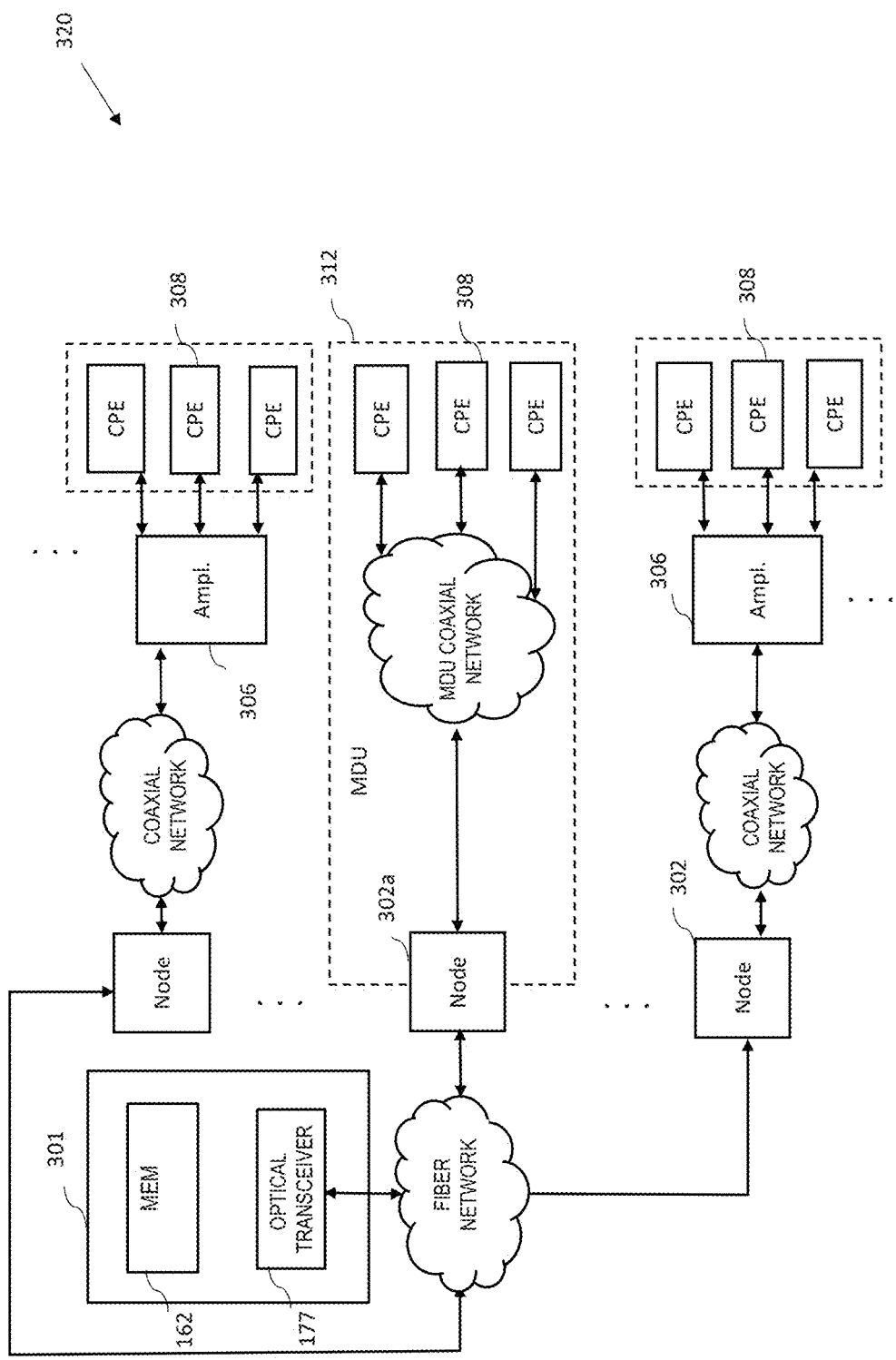
FIG. 3B is a functional block diagram illustrating a second exemplary embodiment of a service provider network architecture according to the present disclosure.

FIG. 3B illustrates another embodiment of the network architecture 320, wherein both groups of individual premises 310 and MDUs or similar 312 are served. In this embodiment, one or more "local" nodes 302a are used to deliver MSO data and signals directly to the MDU 312 and its local (premises) coaxial distribution network without need of an interposed amplifier 306. For instance, the MDU 312 may have an optical fiber drop (e.g., FTTC or FTTH) node proximate thereto or serving the premises (whether via the MSO as in FIG. 3B, or a third party service provider network 344 as shown in FIG. 3C), such that the node 302a can be used to directly serve the MDU premises 312, such as being mounted on a utility pole proximate the premises, or in the case where the node 302a serves only the premises, integrated within the premises itself (e.g., in a telecommunications service ingress/egress room or similar).

In yet other configurations (not shown), the node 302a may be associated with a wireless backhaul (e.g., a roof-mounted antenna/FWA apparatus, such as one utilizing quasi-licensed CBRS spectrum for backhaul).

It will also be recognized that the node 302a may be dedicated to a given premises or MDU 312 (e.g., a "micro-node"), or alternatively be scaled accordingly to serve multiple local MDUs 312 (not shown).

Figure 3C:
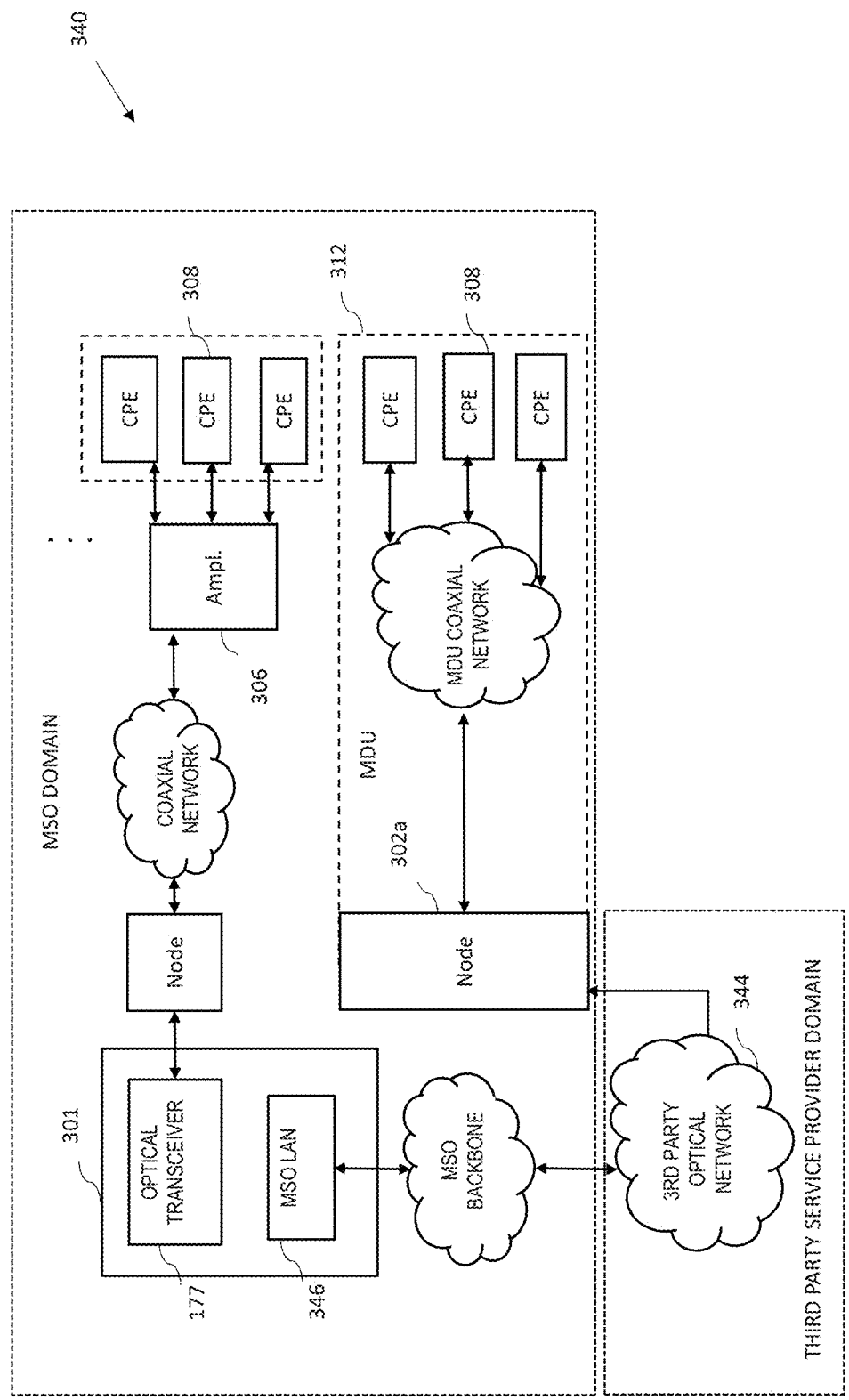
FIG. 3C is a functional block diagram illustrating a third exemplary embodiment of a service provider network architecture according to the present disclosure.

In the architecture 340 of FIG. 3C, one or more nodes in direct communication with the MSO optical network 177 serve a plurality of premises and CPE 308 via one or more interposed amplifiers 306, while one or more MDUs 312 are served by "direct feed" nodes 302a, the latter backhauled by a third-party service provider network 344 such as a FiOS or FTTC provider separate from the MSO.

Figure 3D:
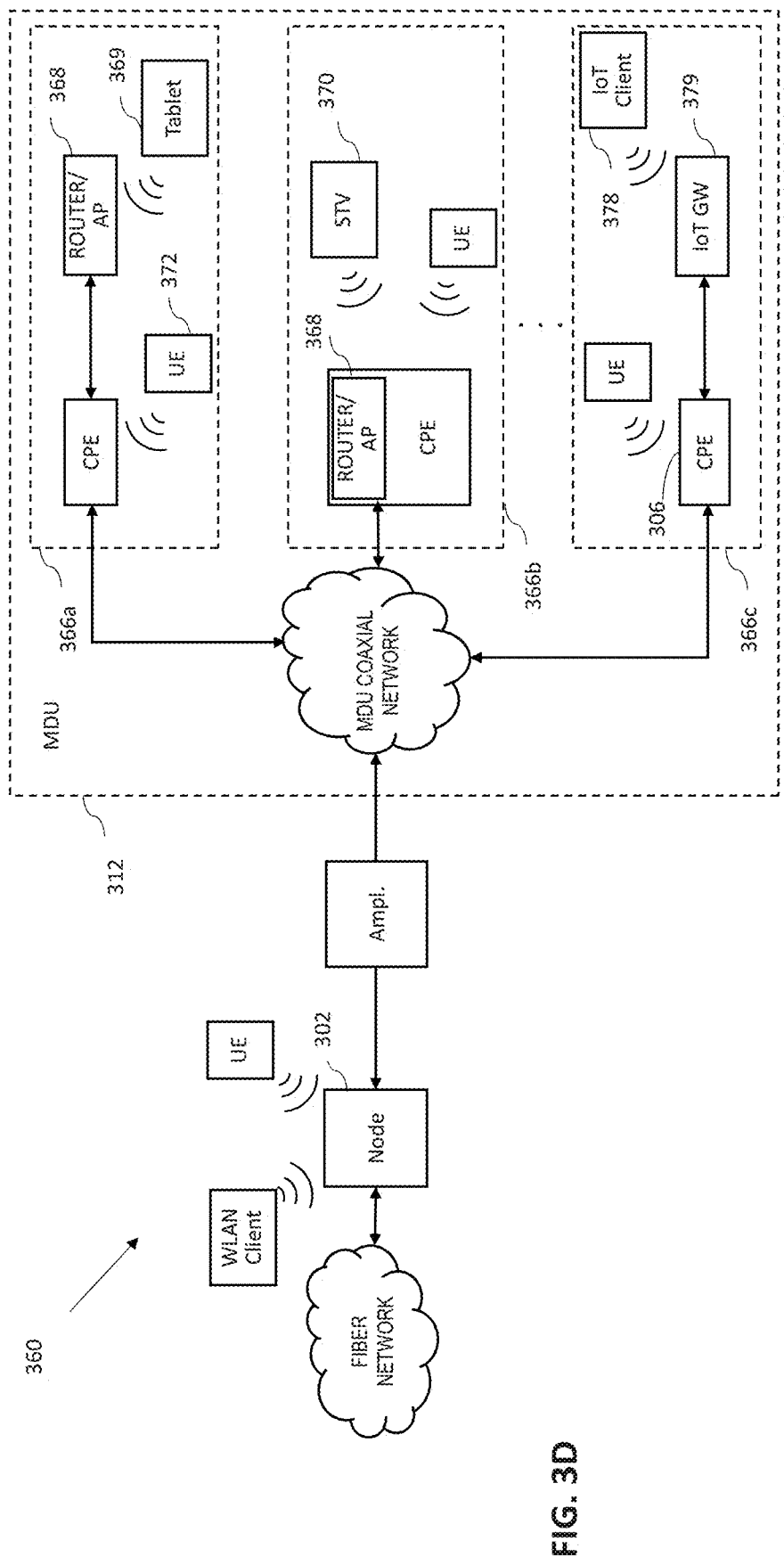
FIG. 3D is a functional block diagram illustrating an exemplary embodiment of a client-side architecture (in the context of an MDU) served by a service provider network architecture.

FIG. 3D is a functional block diagram illustrating an exemplary embodiment of a client-side architecture 360 (in the context of an MDU) served by a service provider network architecture such as one of those of FIGS. 3A-3C. As shown, the node 302, which may be backhauled by e.g., an optical fiber network of the MSO or another service provider, acts as both (i) a backhaul for the MDU 312 and its individual subscribers/users 366a, 366b, 366c, as well as (ii) an ad hoc access node for e.g., WLAN clients (i.e., those operating in one embodiment in the unused 2.4 GHz band associated with the 802.11ax chipsets of the node) as well as user mobile devices such as 3GPP-compliant UE (i.e., the node 302 acts as a cellular repeater or DAS of sorts) by virtue of the node's 3GPP functionality described in greater detail below with respect to FIGS. 7-7A).

In terms of MDU premises services, the node 302 may backhaul UE 372 (whether operating in a licensed cellular band or in an unlicensed or quasi-licensed band such as an NR-U or CBRS or C-band), user mobile WLAN devices such as tablets 369, smart TVs 370 with WLAN capability, and IoT devices such as gateways 379 and/or IoT client devices 378. Various other served premises configurations will be appreciated by those of ordinary skill, including It will also be appreciated that the frequency plan 200 of FIG. 200 may be constructed so as to co-exist with other premises media or protocols which may utilize the indigenous cable medium such as e.g., MoCA 2.0, 2.1, 2.5, or 3.0 systems (whether using channel bonding or otherwise). For instance, in one approach, dynamic spectrum utilization (e.g., for the upper band 204) may be programmed to avoid certain bands which are being utilized or may be occupied by the other systems. In one variant, the controller (discussed below) is informed of such actual occupied or putatively occupied bands by e.g., the MoCa adapter or other such device operative in the premises. In another approach, an LBT or similar medium access approach is used to avoid contention with such systems.

Moreover, while shown primarily in optical backhaul configurations (e.g., the node(s) 302 acting as the boundary between the optical of RF coaxial domains), the nodes 302 may be adapted to utilize other backhaul.

In another aspect of the disclosure, an architecture for providing high data rate, low latency coverage to e.g., large indoor spaces such as office buildings, enterprises, universities, MDUs, etc. is disclosed. One implementation of this architecture utilizes one or more of the foregoing network nodes 302 to supply one or more CPE 308 within the enterprise, etc. via HFC infrastructure, such as a star, bus, ring, tree, or other coaxial cable topology within the served premises. The CPE, by virtue of their repeater/extender functions for cellular and WLAN, provides coverage within the structure for both cellular and Wi-Fi, as well as indoor/outdoor mobility, such as via local pole-mounted access node 302 with 4G/5G and WLAN capability. As such, the CPE collectively act as a distributed antenna system (DAS) for cellular and WLAN signals, as do the intermediary network nodes 302 disposed e.g., at or near the premises in some cases.

Exemplary Methods-

Figure 4:
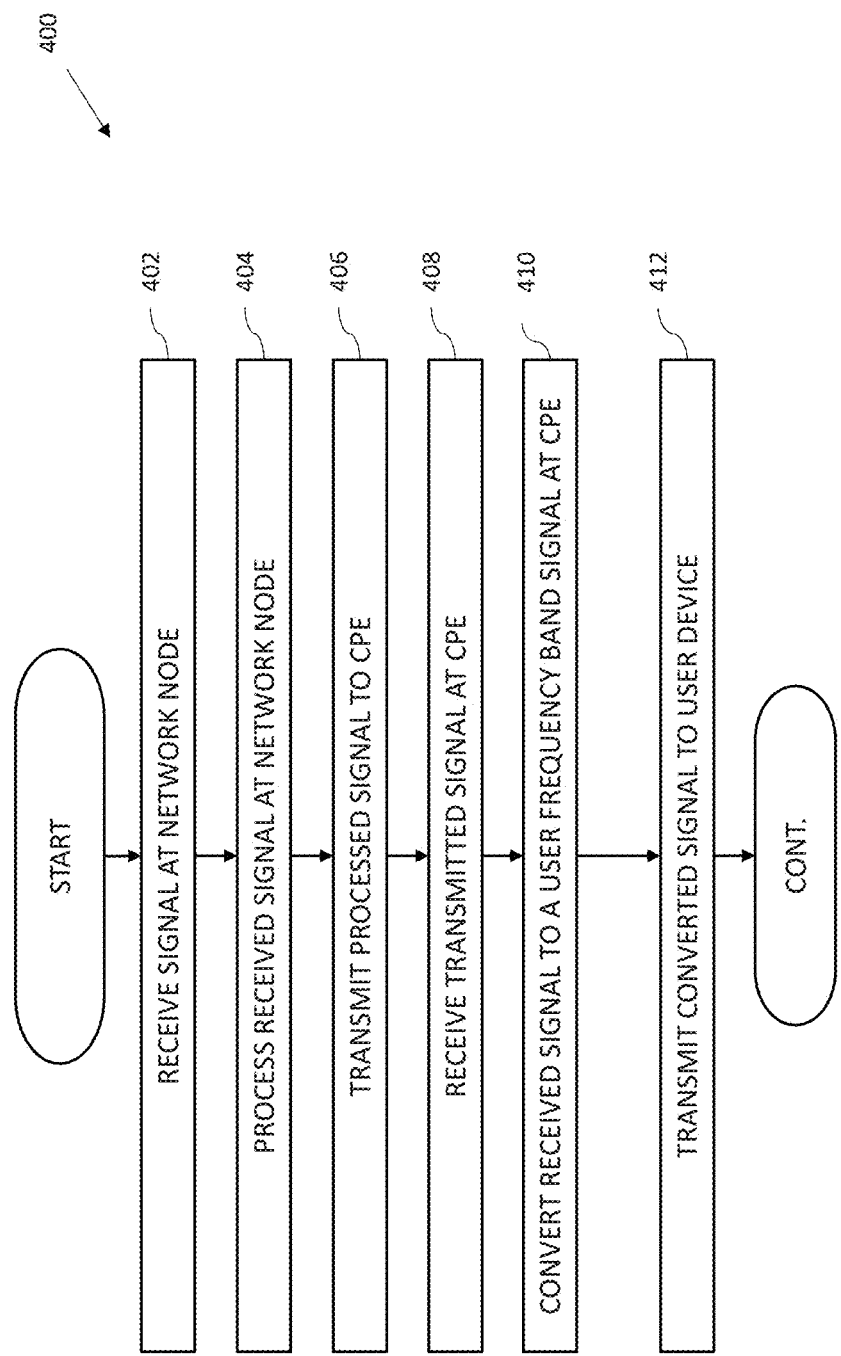
FIG. 4 is a logical flow diagram of an exemplary embodiment of a generalized method for providing high-capacity data service over a content delivery network, according to the present disclosure.

Referring now to FIG. 4, one embodiment of a general methodology for providing high data rate services over a content distribution network such as the architectures 300, 320, 340 previously described with respect to FIGS. 3A-3D is described.

As shown, per step 402, one or more signals is received at a network node 302. In one variant, the signals are received via an optical interface such as one connected to DWDM ring or the like. Alternatively, a wireless link such as an mmWave system may deliver the signals to the node 302.

Per step 404, the received signals are processed at the network node 302. In one variant, as shown and described in greater detail with respect to FIG. 4A, one or more 802.11ax-based components are utilized to process the received optical domain signal (e.g., via an SFP port of the node 302) to the RF domain. For example, as discussed further herein, one or more 4×4 802.11ax modules 708 (FIG. 7) can be used to process the signal to e.g., enable an enhanced feature set as supported by the 802.11ax technology ecosystem. The foregoing feature set includes, but is not limited to, e.g., symmetric high-bandwidth data operation and data processing scheduling (e.g., prioritization of real-time data over non-real-time data, QoS prioritization, etc.). Exemplary protocols for the APs (and STAs described with respect to FIG. 9 below) are set forth in "P802.11ax—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN" dated Dec. 6, 2017, which is incorporated herein by reference in its entirety.

In this variant, one or more frequency shifter modules 712 (FIG. 7) are also utilized to down-convert the signal to be transmitted at a frequency appropriate for downstream communications (e.g., from the 5 GHz band signals generated by the 802.11ax AP, to be put on coaxial cable infrastructure at the appropriate portion of the bands shown in the frequency plan 300 of FIG. 2).

Per step 406, the processed and down-converted signals are transmitted downstream towards the served CPE 308. In one variant, the signal is transmitted downstream via coaxial cable infrastructure. Such transmission via the coaxial cable allows the signal to be propagated via e.g., an extant coaxial cable infrastructure of an MSO, so that the data can travel downstream at a high data rate even though the coaxial cable infrastructure is used.

Per step 408, the signal is received at one or more served CPE 308. In one variant, the signal is received via coaxial cable interface (e.g., 75 Ohm connector or similar).

Per step 410, the received signal is converted to a signal at a user frequency band. For example, in one variant, one or more frequency shifter modules 910 (FIG. 9) are used to convert the signal to e.g., a 2.4 GHz Band, 5 GHz band, or even mmWave frequencies (e.g., 24-100 GHz, such as 60 GHz).

Per step 412, the converted signal is transmitted to a user device. Such transmission may be wireless, wireline, or both. For instance, the transmission may be in the form of an unlicensed band transmission via a Wi-Fi AP, a 3GPP HNB or Femtocell, from the CPE 308 itself, via Ethernet (IEEE Std. 802.3) interface, or other.

It will be appreciated that generally speaking, the methodology for UL/US transmissions is analogous to that for DS/DL, yet inverted.

Figure 4A:
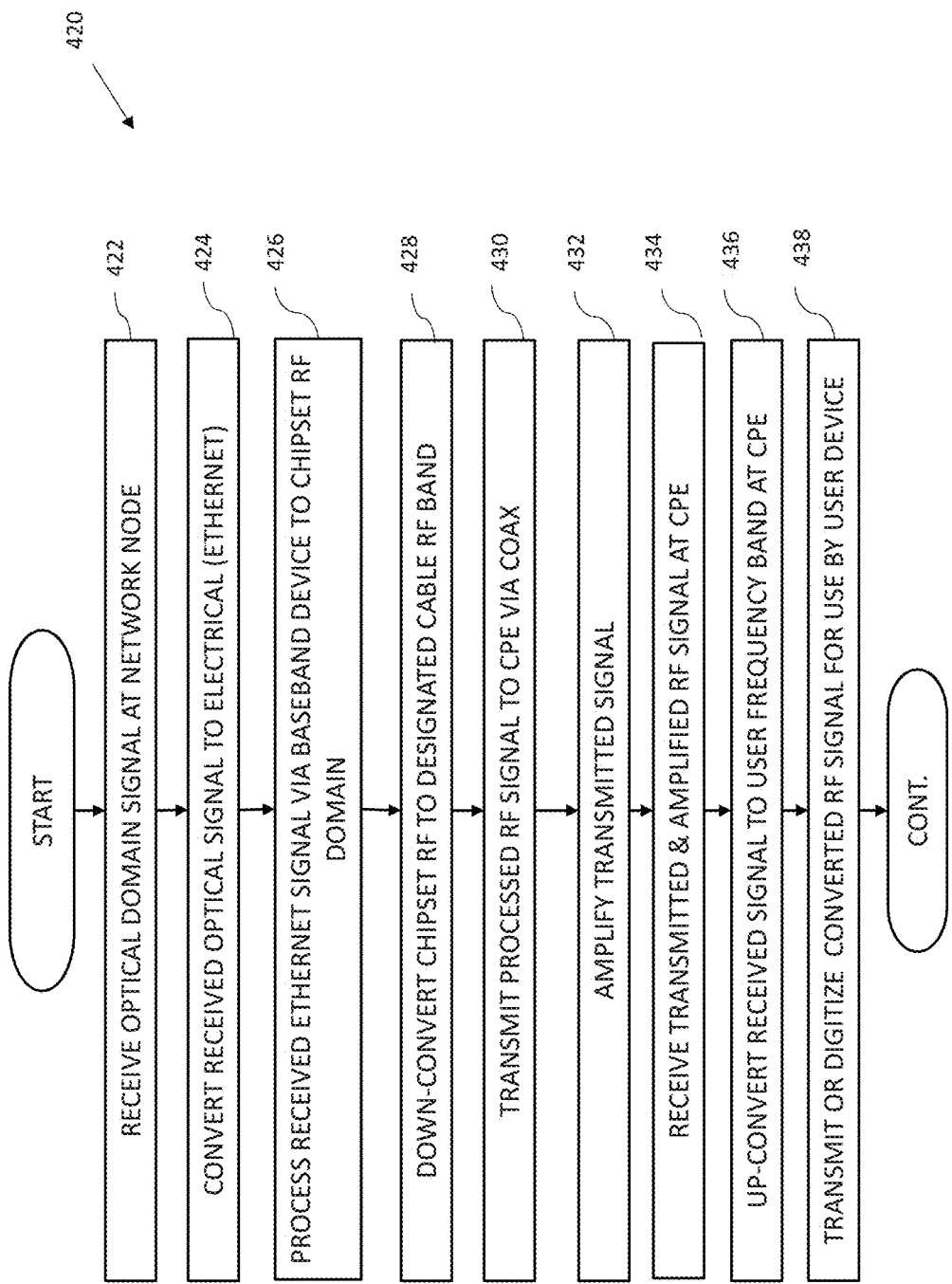
FIG. 4A is a logical flow diagram representing one variant of the generalized method of FIG. 4, according to the present disclosure.

FIG. 4A illustrates one exemplary implementation of the general method of FIG. 4. As shown, the method 420 of FIG. 4A includes first receiving an optical domain signal at the node 302 (e.g., via an SFP or similar connector or port) per step 422.

Next, the received signal is converted from the optical domain to the electrical domain (step 424), such as via an SFP-Ethernet converter of the type known in the art. The electrical signal is then converted via the 802.11ax chipset (baseband device) to RF frequencies associated with the 802.11ax Standard (e.g., 2.4 GHz band, and 5 GHz band) per step 426.

Per step 428, the chipset RF frequency is down-converted (via the frequency shifters referenced above) to the appropriate band of the associated frequency plan 200, which notably may vary as a function of time, user, direction (UL/DL), etc.

Per step 430, the processed and down-converted signal is transmitted onto the coaxial distribution network.

Per step 432, the transmitted signal is amplified by the amplifier(s) 306 (FIG. 8) as needed/if present within the transmission chain.

Per step 434, the transmitted (and amplified) signal is received at the CPE 308 via e.g., the coaxial interface on the CPE.

At step 436, the received signals are up-converted by the CPE to one or more user frequency bands, such as by a frequency shifter and 802.11 AP chipset within the CPE. Similarly, cellular band signals if present are up-converted to the appropriate cellular band (whether licensed or unlicensed/quasi-licensed).

Lastly, at step 438, the up-converted signals are transmitted at the served premises by the CPE (or other devices connected thereto, such as via Ethernet interface) for use by the user's equipment (see FIG. 3D).

ISM Band Data Communication

Referring now to FIG. 5, one embodiment of a general methodology for ISM band data communication, useful with various aspects of the present disclosure, is described.

As shown, per step 502, device (e.g., node 302) information is obtained. In one variant, the device information comprises globally unique identifying information, such as MAC address, of the network node. In another variant, the identifying information is unique at least within the portion of the network in which the node is utilized. In yet another variant, the node information comprises a combination of identifying information of the network node, and other identifying information associated with other components within the network (such as the amplifier apparatus 306 that is in-between the network node 302 and CPE 308). In one scheme, each transmitting node or device within the cable network infrastructure is assigned an at least locally-unique code or identifier by which the node can be "fingerprinted" as a source of RF-band emissions. In this fashion, any unwanted or unplanned OTA (over the air) emissions from the cable plant (e.g., due to cable insulation damage, band connectors, or other failure modes) can be detected and localized based on the identifier data, as described in greater detail subsequently herein.

Returning to FIG. 5, at step 504, a message related to the obtained node/component information is generated. In one variant, the message is encoded in a signal to be transmitted via the ISM band as a string of ASCII characters. Other formats and protocols may be used as well.

Per step 506, the message is transmitted via the selected portion of the ISM band onto the cable medium. In one variant, the message is broadcast such that any device that can detect, demodulate and decode the message. This may also include transmission in more than one sub-band within the broader ISM band available to the device on the cable. In some variants, the message has no intended recipient (i.e., is not addressed to any network address or target device per se). Since it occupies an unused band on the cable medium and is transmitted at comparatively low power, no salient interference from this signal is experienced.

In another variant, the message is unicasted to a prescribed network entity (e.g., via Layer 3 and above protocols), including one which manages a database comprising information communicated via ISM band in the MSO network. For instance, a downstream or upstream node may include a receiver for the ISM message if desired.

Lastly, per step 508, the ISM band is monitored by one or more external devices for the transmitted message. The received message comprising e.g., data related to identifying information of a network node 302 or other components can be useful for e.g., detecting cable medium leakage, which is required to be monitored by mandate of the FCC.

In one variant, the monitoring comprises use of a fixed or portable monitor capable of receiving signals in the designated band(s) of transmission of the transmitting node 302/amplifier 302, which may be known to the monitoring device. For example, in one implementation, a user or handheld mobile device is used to canvass various locations within the network for any external (i.e., exterior to the cable or connectors) RF emissions within the designated band(s) which would be indicative of leakage of the signal in that band.

In another implementation, the monitoring device uses e.g., energy correlation or detection to identify the band of use, and based thereon, the device can attempt to receive and demodulate the transmitted message to retrieve the identifier data. For instance, other ISM band transmissions may exist during monitoring, but the monitoring device is capable of distinguishing these such as based on a medium access or modulations scheme, code, or other data enabling selective identification and decode by the receiver.

Figure 5A:
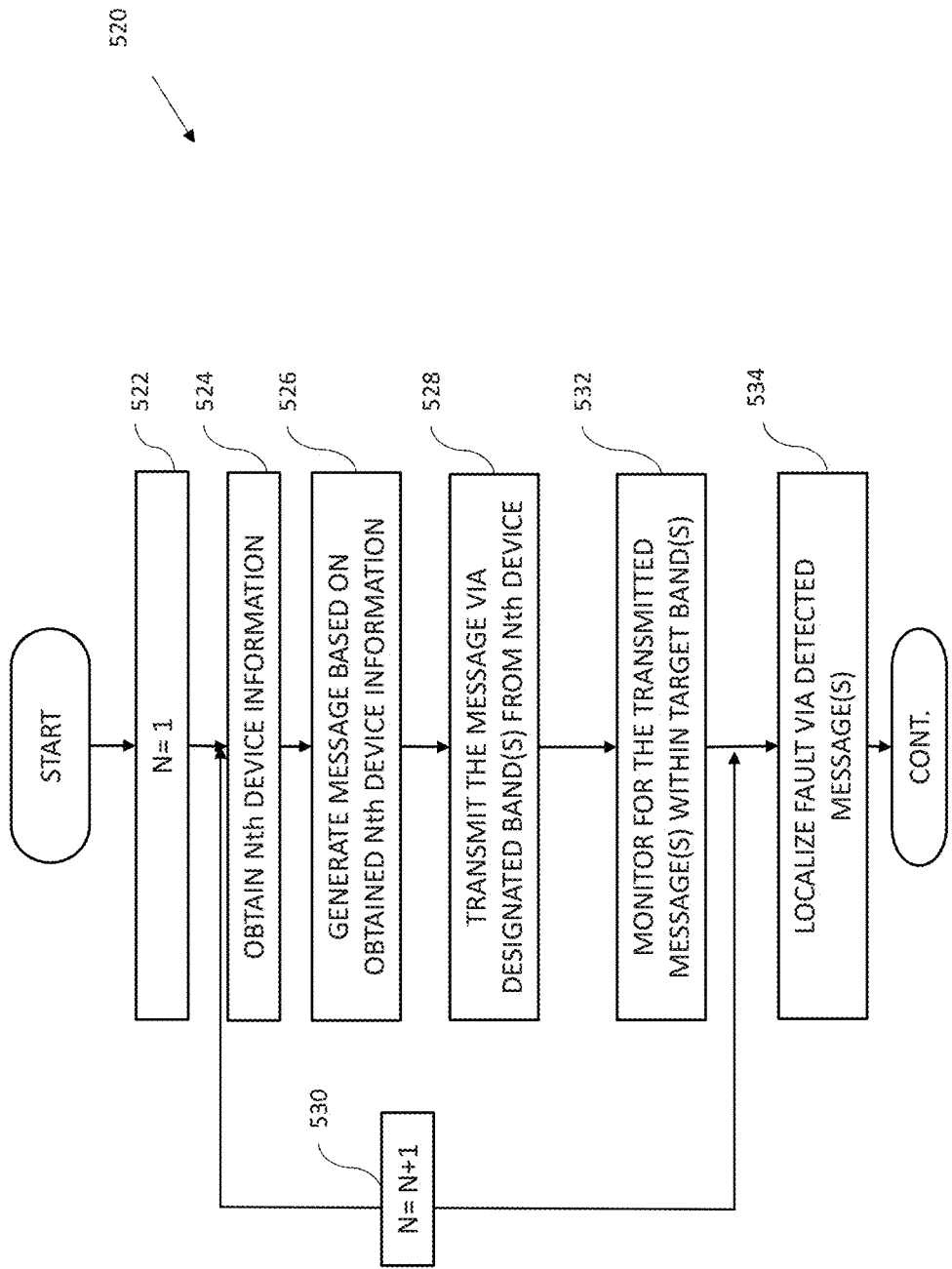
FIG. 5A is a logical flow diagram representing one variant of the generalized method of FIG. 5, according to the present disclosure.

It will also be appreciated that the presence or absence of detected energy or messages in the designated ISM bands used for transmission by the nodes or other components (e.g., amplifiers, CPE, etc.) can be used to infer leakage in other frequency bands as well. Generally speaking, the presence of leakage in the ISM band will be accompanied by leakage in other spectral regions (i.e., if a cable or connector is damaged, it will often radiate in a wide swatch of frequencies). As such, the ISM band approach described herein can be used as a convenient and low-cost "first indicator" of trouble within the cable plant wiring or components, since ISM band chipsets and transmitters/receivers are now ubiquitous and unlicensed, and hence are highly commoditized. Referring now to FIG. 5A, one variant of the general methodology of FIG. 5 according to the present disclosure is described.

As shown, per step 522, a counter (N) is set to an initial value; e.g., N=1.

Next, per step 524, the device-specific identifier or data for the Nth device is obtained, and per steps 526 and 528, the message is generated and transmitted onto the cable medium from the transmitter. In one variant, the transmitter is correlated to the counter index (N), such that for example Node A in the network transmits a first message with its unique identifier data, amplifier A transmits a second message with its unique data, and so forth, such that N unique messages are generated and transmitted onto the cable medium within the ISM band (whether in sequence, simultaneously, or according to another scheme). The transmitting nodes may also utilize a multiple access scheme, such as FDMA or TDMA, such that each node has a prescribed time and/or frequency resource for its message so as to avoid interference or collisions.

In another approach, each node or component transmitting in the ISM band can transmit independent of the others; e.g., at a prescribed periodicity, based on occurrence of an event, etc. This approach has the advantage of great simplification, since each component or node essentially sends out its own "beacon" irrespective of the others, with a monitoring device capable of detecting all transmitted messages within the ISM band if a prescribed leakage exists.

Per step 532 of FIG. 5A, the target bands/resources are monitored for the transmitted messages, such as via a fixed or portable monitoring device capable of receiving ISM-band RF energy and demodulating/decoding the data contained therein.

Per step 534, the identifier data obtained in step 532 is then used to localize the fault/leakage within the network. For instance, if the only message detected and decoded indicates identifier data for Amplifier No. 123, then it is known that the leakage is occurring at or downstream of that amplifier, and presuming no ISM-band message for the next downstream node or device is detected, the leakage can be safely presumed to be before the next node.

Figure 6:
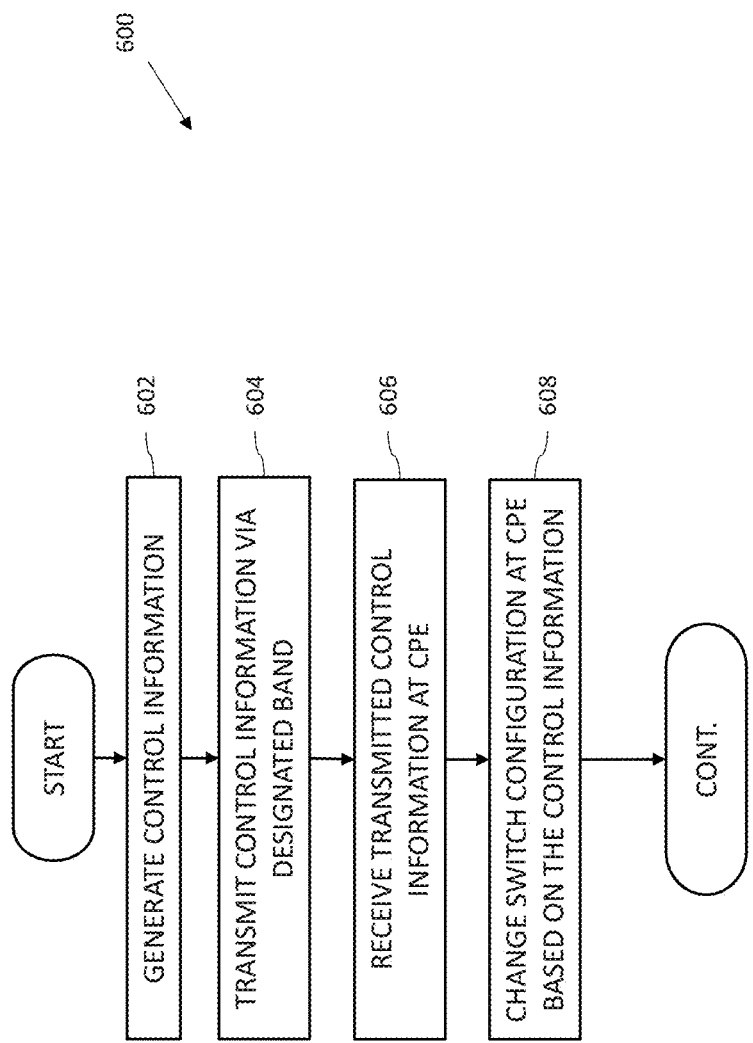
FIG. 6 is a logical flow diagram representing a generalized method of controlling switching behavior of a CPE, according to the present disclosure.

Referring now to FIG. 6, one embodiment of a method of utilizing designated band (e.g., ISM band) communications to transfer control information over an architecture such as that of FIGS. 3A-3D is shown and described.

Per step 602 of the method 600, control information is generated, such as by a transmitting entity. For instance, in one embodiment, the control information relates to switching functionality to be implemented within one or more of the CPE 308 (see discussion of FIG. 9 elsewhere herein); i.e., switching control of the CPE switch matrices 912 between different sources for each individual 802,11 ax STA chipset 918 within a given CPE. As such, the exemplary control data may be related to a single CPE, or multiple CPE, whether part of an MDU, or individually served. FIG. 3A illustrates one exemplary control configuration, wherein a network (e.g., headend) controller process 314a is logically communicative with a node controller process 314b, an amplifier controller 314c, and a CPE controller process 314d. The downstream controller processes 314b-d may for instance be addressed by the headend process 314a via Layer 3 or above network protocols, via the physical channels connecting each (e.g., optical domain, cable plant, MSO LAN, or other). In other embodiments, the local node controller 314b may act as the dominant or master control process for all CPE and amplifiers downstream of it. In yet another variant, the control logic may be disposed in the amplifier or even one or more of the CPE served, such that various portions of the cable infrastructure can operate effectively autonomously of one another (yet cooperatively within its own domain, such as between two or more CEP in a given MDU). Yet other schemes will be appreciated by those of ordinary skill.

Next, per step 604, the generated control information is transmitted onto the cable plant via one or more designated frequency bands, such as within the ISM band 210 of FIG. 2.

At step 606, the transmitted control information is received by the targeted one or more CPE 308, and the switch configuration of the CPE altered based on the data per step 608.

Figure 6A:
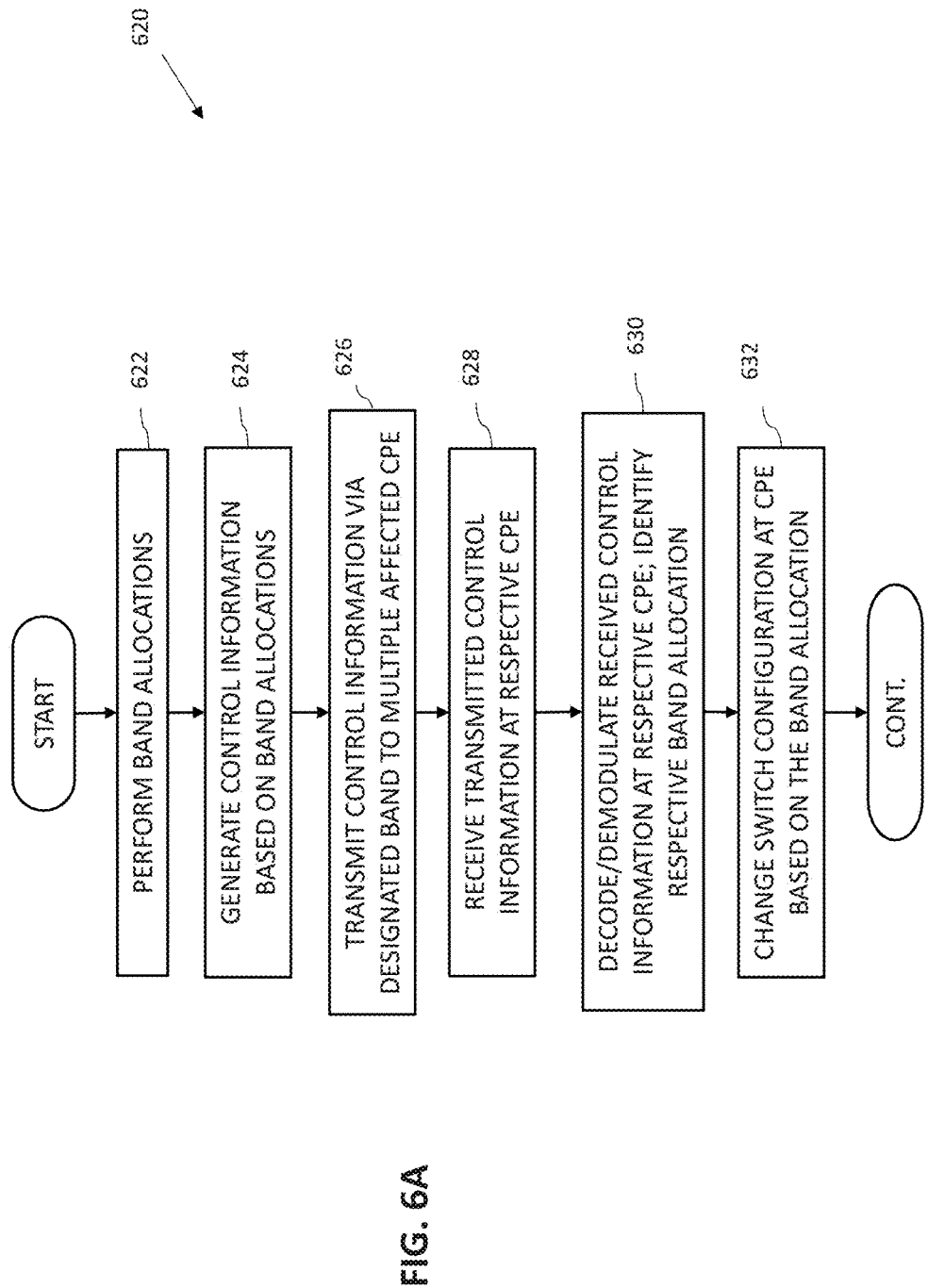
FIG. 6A is a logical flow diagram representing one variant of the generalized method of controlling switching behavior of a CPE of FIG. 6.

FIG. 6A illustrates one exemplary implementation of the general method of FIG. 6. Specifically, in this implementation 620, band allocation is first performed for at least the controlled portion of the infrastructure (e.g., an exemplary MDU served by a node such as in FIG. 3D for purposes of simplicity of illustration) per step 622.

Next, per step 624, control data is generated based at least on the band allocation(s) of step 622. For instance, the band allocations may allocate all or a portion of a first 160 MHz band associated with one 802.11ax AP (see FIG. 2) to one CPE within the MDU, while another CPE in the MDU receives an allocation associated with a different 160 MHz band.

Per step 626, the generated control data is then transmitted on the RF cable plant to the target/affected CPE (which may be in the form of e.g., a unicast or a broadcast message with specific data for certain CPE IDs within the system).

Per step 628, the transmitted control data is received by at least the target/affected CPE, such as via the coaxial cable connector and coupler 902 (FIG. 9) to the CPE.

Per step 630, the receiving CPE demodulate and decode the received transmissions, and extract the relevant band identification data (or other data) enabling the CPE to implement the desired switching policy. For example, in one approach, the received control-band (e.g., ISM band) signals are received by the CPE via its ISM transceiver 916, demodulated and decoded therein, and the control message data extracted for use by the CPE control process logic 314*d* in control of the switch element(s) 914 of the CPE (per step 632) as discussed in greater detail below with respect to FIG. 9.

It will also be recognized that the techniques of FIGS. 5 through 6A may be combined together if desired, such as where the control signals transmitted from e.g., the node 302 to the one or more CPE 308 for switching or other purposes are also utilized for fault/leakage detection, such as where the ISM-band control message data includes the (most current) transmitting node identifier data. In one such variant, ASCII character data indicative of a globally or locally unique component is included within or appended as a PDU to the control messages.

Exemplary Network Node Apparatus-

Figure 7:
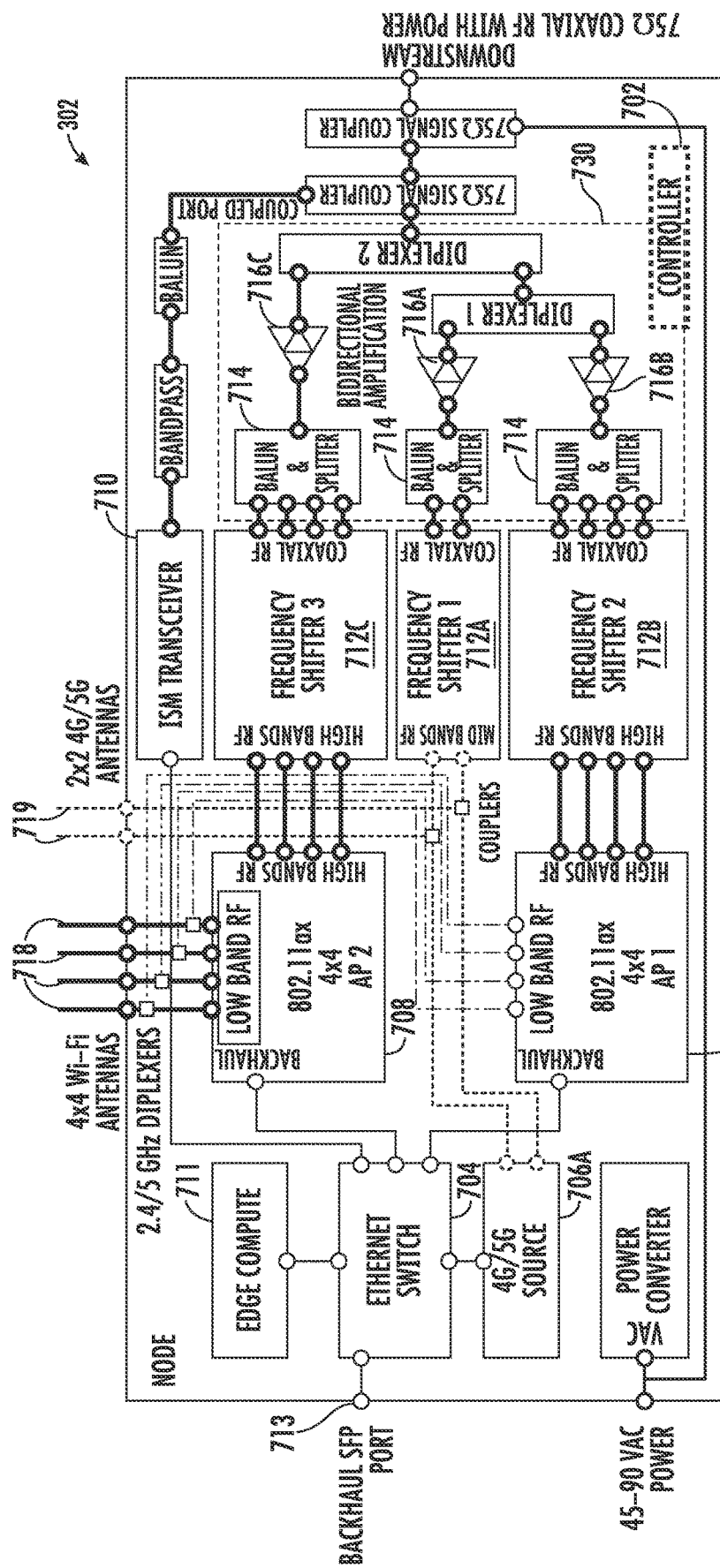
FIG. 7 is a functional block diagram illustrating a first exemplary configuration of a network node apparatus according to the present disclosure.

FIG. 7 illustrates an exemplary embodiment of a network node apparatus 302 configured according to the present disclosure. As shown, this embodiment of the network node 302 includes, inter alia, a controller subsystem 702, an Ethernet switch 704, a cellular source 706A, two (2) 4×4 802.11ax chipsets 708, an ISM transceiver 710, one or more frequency shifters 712, one or more splitters 714, diplexers 716, and 4×4 Wi-Fi antennas 718, and 2×2 cellular antennas 719.

In one variant, the Ethernet switch 704 interfaces with the fiberoptic backhaul via e.g., one or more SFP ports 713, as well as edge compute apparatus 711 and a cellular source (e.g., of a 4G/5G signal) 706A such as an LTE or 5G NR-based chipset (e.g., a combination of a cellular (4G/5G) baseband processor such as an xNB (eNB or gNB) modem chip and radio frequency integrated circuit (RFIC), akin to the principal components of a small cell) to the Ethernet switch interfaces with the 4×4 802.11ax W-Fi AP chipsets 708. As previously referenced, so-called Wi-Fi 6 as available on the 802.11ax Wi-Fi APs 708 can generate carriers of up to 160 MHz of frequency bandwidth (only supported in the 5-GHz spectrum at present).

In one implementation, any resource which is not used from each of the 802.11ax APs 708 (e.g., 2.4 GHz channels, in that the 160-MHz channels are not supported for data communication at 2.4 GHz), can be used to provide ancillary functionality or services from the node, such as e.g., a Wi-Fi AP service to surrounding Wi-Fi devices (e.g., MSO subscribers who happen to be proximate to the node) via 4×4 Wi-Fi antennas 718 (see FIG. 3D). Similarly, the cellular source 706A can provide a local cellular repeater or extender service function (e.g., to local MSO subscribers who happen to be proximate to the node) via e.g., 2×2 cellular antennas 719.

Additionally, one or more frequency shifter modules 712 are used within the node 302 to convert the frequency of the signal(s) to be transmitted downstream to that appropriate for the coaxial cable infrastructure. As shown in the embodiment of the frequency plan 200 of FIG. 2, these bands may include for example 110-750 MHz and 950-1590 MHz bands 202, 204, although it will be appreciated that other bands may be used. Multiple frequency shifter modules 712*a-c* can be utilized to process signals of different frequency bands, access schemes, and/or types of modulation schemes. For example, the signals received from the 802.11ax AP modules 708 can be of (i) a first frequency band on the cable medium; (ii) OFDM modulation, and (iii) Listen Before Talk (LBT) access type, which in part enable the previously described symmetric capabilities, while the cellular signals from the cellular source 706A may be of either Frequency-Division Duplex (FDD) or Time-Division Duplex (TDD) access on a different frequency band on the cable (e.g., 5-85 MHz). Due to different operation modes and functions, different frequency shifter modules 712*a-c* can be used to e.g., avoid interference by increasing noise isolation of each signal from one another, and also eliminate the need to coordinate the shifters. In the illustrated architecture, each 802.11ax AP 708 can act independently of the other(s), and be allocated for downstream and upstream transmission of data, as described in greater detail elsewhere herein.

It will be appreciated that, as further advancement is made in the related technology ecosystem (802.11ax in the exemplary embodiment), new bandwidth-related functions such as channel bonding can be applied to the aforementioned 160-MHz channels to create even larger capacity channels for data communication, thereby allowing further scalability of parameters or constraints of the system, such as the number of Wi-Fi modules/APs 708 to be used, and any associated number of frequency shifters (or other node components such as baluns, splitters and bidirectional amplifiers) to be used.

Similarly, separate, different bidirectional amplifiers 716 can be utilized to process the e.g., LBT, FDD, and TDD signals of the different US and DS frequency bands. It is noted that the configuration of each bidirectional amplifier in the illustrated embodiment of the node 302 is heterogeneous or asymmetric with respect to its US and DS directions; i.e., each amplifier will operate differently in the US versus the DS, as necessitated by the different signals carried in each direction and the topology of the node (i.e., configuration of the baluns, diplexers, splitters and bidirectional amplifiers relative to one another). As a brief aside, a bidirectional amplifier for an FDD carrier would continuously amplify a different portion of spectrum on the cable for each direction (i.e., upstream and downstream). Conversely, a bidirectional amplifier for a TDD carrier would alternate between amplifying the same portion of spectrum on the cable in the upstream or downstream direction according to e.g., a fixed, configurable or adaptive duty cycle. For fixed or configurable duty cycles, the amplifier can switch between downstream and upstream modes based on e.g., a phase lock loop (PLL) trained on the presence of downstream energy. For adaptive duty cycles, such as with dynamic TDD in 5G NR, the downstream direction can be amplified when the presence of energy in that direction within the allocated spectrum of the cable is detected. The upstream direction can be amplified when energy is not detected in the downstream direction.

A bidirectional amplifier for an LBT carrier would operate the same way as a bidirectional amplifier for a TDD carrier with an adaptive duty cycle. The downstream direction can be amplified when the presence of energy in that direction within the allocated spectrum of the cable is detected. The upstream direction can be amplified when energy is not detected in the downstream direction.

Moreover, depending on placement within that topology, the bidirectional amplifier 716A associated with the first frequency shifter 712A may be different than that 716B of the second frequency shifter 712B, and different than that 716C of the third frequency shifter 712C. It will also be appreciated that the implementation of each bidirectional amplifier apparatus will be readily accomplished by those skilled in the art given the present disclosure.

Furthermore, it will also be appreciated that while 802.11ax AP modules 712 are discussed herein for the advantage of e.g., their developed ecosystem, and ability to use 256-QAM with Wi-Fi 6 (thereby enhancing data rate due to higher order modulation as compared to e.g., 64 QAM of other types of ecosystems), different types of chipsets or ecosystems may be substituted depending on the nature and requirements of the application.

Moreover, it will be recognized that the actual over-the-cable RF frequency for the cellular carrier (e.g., of 5-85 MHz as shown in FIG. 6) can be utilized to e.g., support cellular frequency bands other than nominal cellular frequencies on the order of 1 to 2 GHz, including for example emerging standards operating in higher frequencies such as sub-6 GHz 5G or mmWave 5G devices.

In operation, the diplexers 717A, 717B are tiered or arranged in a hierarchy such that the first diplexer 717A is coupled to the first and second frequency shifters (via the bidirectional amps 716 and the baluns and splitters 714) as well as the second diplexer 717B, the latter also coupled to third frequency shifter 712C and the downstream port (via the signal and power couplers). In this fashion, the signals (e.g., those from the frequency shifters) can be frequency-domain multiplexed onto the output of each diplexer as appropriate for transmission via the downstream port to the amplifier and ultimately the recipient CPE. Similarly, upstream signals received via the couplers are diplexed via diplexer 2 717B to (i) the first diplexer 717A, and (ii) the balun and splitter associated with the third frequency shifter 712C. The first diplexer 717A allows splitting of the signal based on frequency into the cellular components (for the first frequency shifter 712A) and those for the first Wi-Fi AP 708, while the second diplexer 717B splits off the second Wi-Fi AP signals. So, in effect, the node acts as an aggregator or combiner in the DS direction (toward the amplifier and CPE) and a dis-aggregator in the US direction.

Figure 7A:
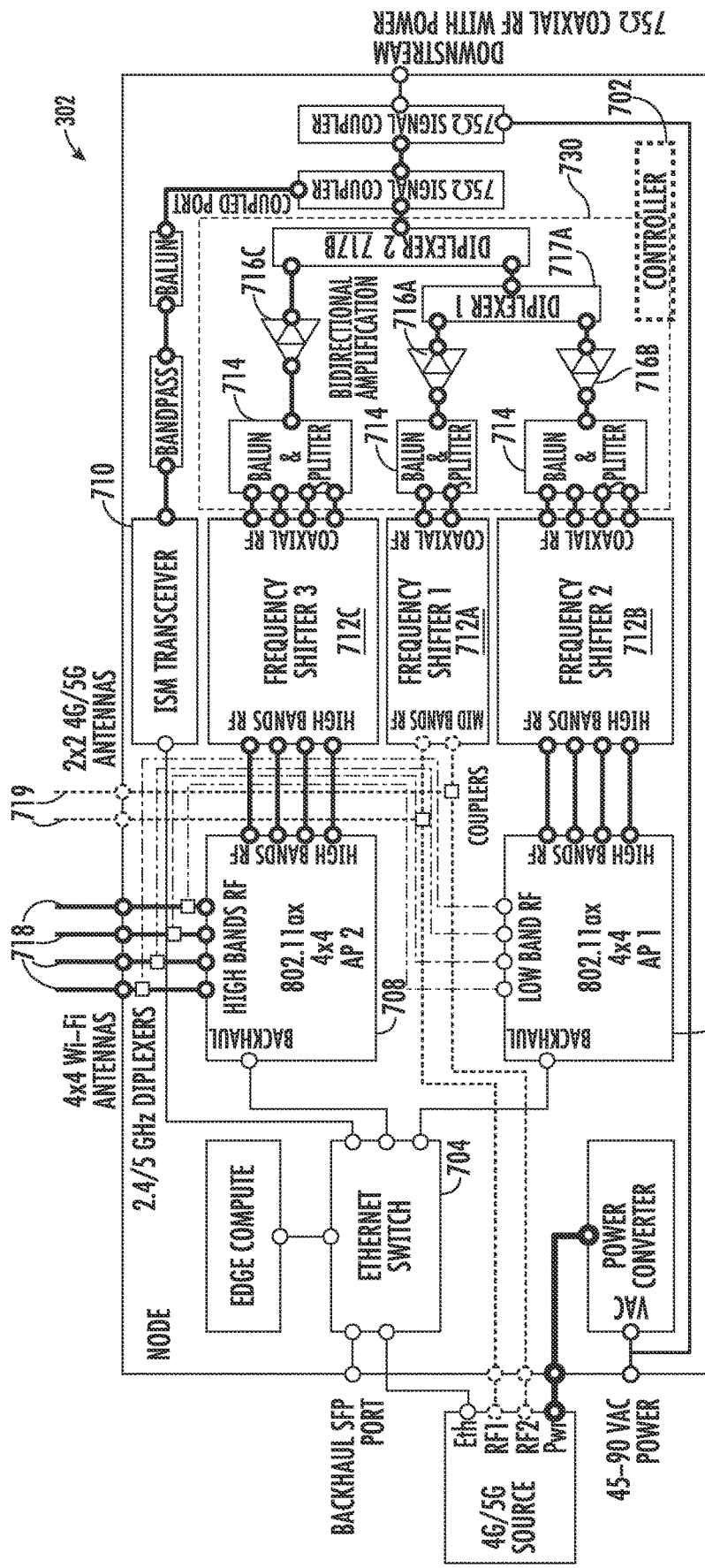
FIG. 7A is a functional block diagram illustrating a second exemplary configuration of a network node apparatus according to the present disclosure.

In another variant, as shown in FIG. 7A, an external cellular source 706B can be utilized, instead of an integrated cellular source 706A of the embodiment of FIG. 7. For example, a "first tier" network node vendor which can provide macro cellular capacities (e.g., components capable of serving hundreds or thousands of simultaneously connected users) with appropriate baseband capabilities in hardware and software to support such high capacities, can utilize its own cellular solution as an integrated part of the network node 302. However, for a second-tier network node vendor which lacks the expertise or capacity (e.g., in 3GPP technology) to integrate a cellular solution into its network node 302, it can obtain the cellular solution from an external source, and utilize this solution in conjunction with the network node 302 of FIG. 7A. For example, a femtocell for serving 64 or 128 users (e.g., in a small MDU) can be used as an external cellular source 706B for a such Tier 2 node vendor, thereby enabling a broader range of use cases and applications of the various functions of the apparatus and methods of the present disclosure.

As previously discussed, the ISM transceiver 710 of the exemplary node 302 can be used to encode data related to identifying the node, and/or enabling a correct configuration of a switch component 914 of one or more CPE 308. In one implementation, the ISM transceiver 710 can be used to encode data identifying the node so that such information can be used for pinpointing the location of any RF signal leakage within the signal via e.g., portable or fixed monitor. Per FCC there are requirements imposed on network operators to detect any RF signal leakage. Such RF signal leakage can cause for example interference with the licensed frequency spectrum allocated to MNOs. Although the RF signal on any portion of the cables within an HFC network should be contained, any event that may expose the RF signal on the cables to the surroundings (e.g., by mechanical damage to the cable or connectors), the node identifying information communicated via the ISM band can be useful in pinpointing the location of the leak by allowing any entity receiving this information via the ISM band to be able to identify each node by such identifying information. As previously noted, if RF signal leakage occurs at a higher frequency spectrum of the cable, then leakage will typically also occur within the ISM band, and the controller 702 can radiate ISM-band energy via the ISM transceiver 710 including the identifying information (e.g., MAC address) of the transmitting network node. Because the ISM band is specifically to be used for transmission of these signals, the ISM transceiver 710 need not be connected to any frequency shifter as with the other signal sources (i.e., 802.11ax chipsets and cellular source), as the ISM signal does not require any shift in its frequency. It will be appreciated, however, that different frequencies can be used, and/or some degree of frequency shift can be applied if desired, such as in cases where the available spectrum of the frequency plan is at a higher frequency (e.g., an unlicensed band such as 2.4 GHz). As previously referenced, one benefit of using unlicensed frequency bands for such transmissions is that the transceiver 710 and any receiver used to monitor for leakage of the signals, or receive control information (such as in the CPE), are highly commoditized and hence low cost. Moreover, any "intentional" ISM signals which may leak cause no deleterious radiation in the surrounding environs where the leakage occurs (other than perhaps some additional ISM band interference), and hence the leakage can be detected readily, at low cost, and with no effects on licensed bands.

Figure 7B:
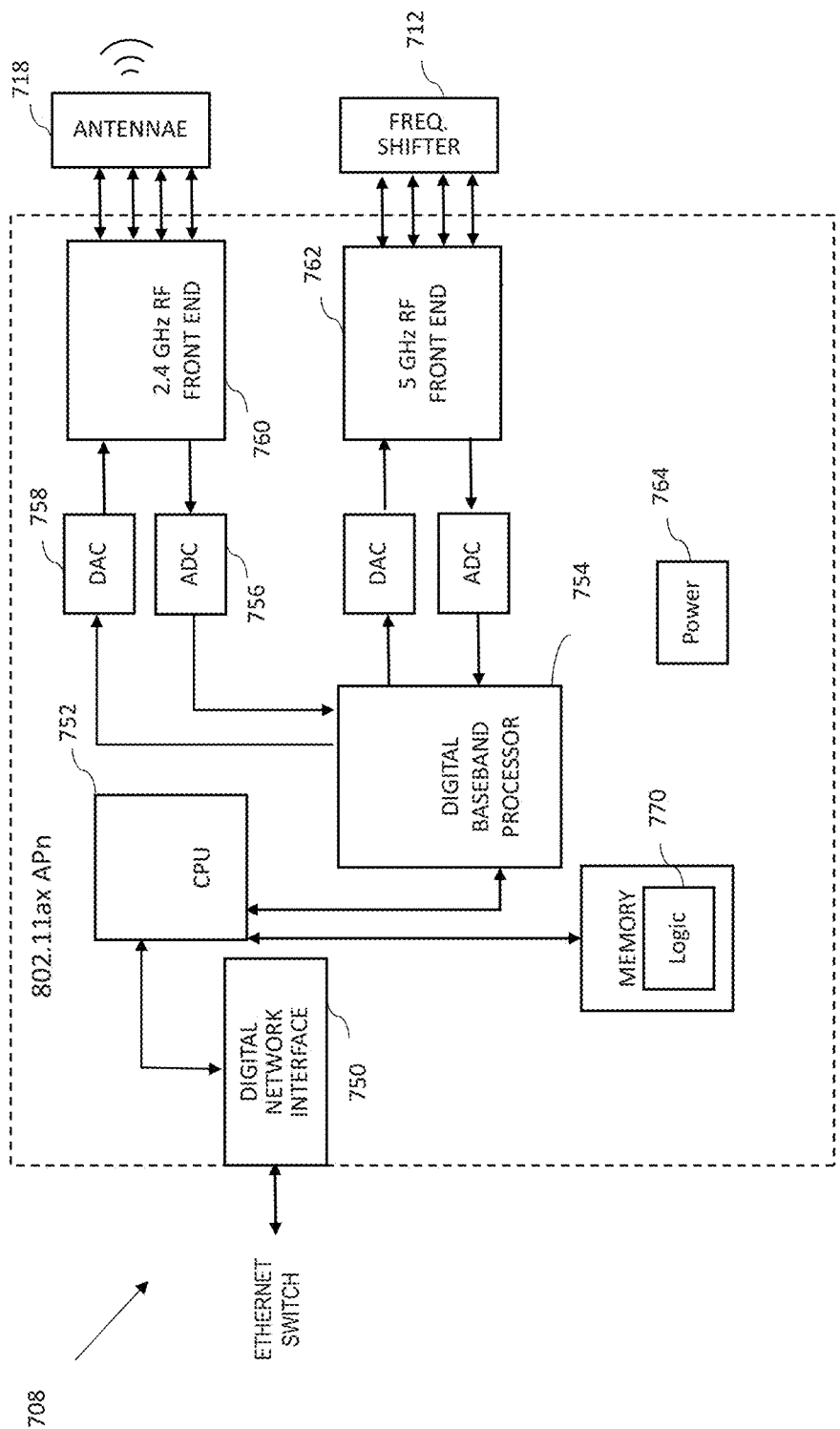
FIG. 7B is a functional block diagram of one embodiment of an IEEE Std. 802.11ax-enabled access device according to the disclosure.

FIG. 7B illustrates one embodiment of an exemplary IEEE Std. 802.11ax chipset used in conjunction with the nodes 302 of FIGS. 7 and 7A. As shown, the chipset 708 includes a digital network interface 750 (e.g., Ethernet or other protocol), a CPU 752, a digital baseband processor 754, DAC 758 and ADC 756 for digital to analog domain (and vice versa, respectively) conversion of the baseband signals, two RF front ends 760, 762 for the 2.4 GHz and 5 GHz bands respectively, one or more antenna elements 718 for the lower band front end 760, and one or more frequency shifters 712 for the upper band front end 762. A power supply module 764 is also included.

In operation, the baseband chipset processes baseband data received via the digital interface 750 for transmission over one of the two transceiver chains (2.4 GHz OTA, or 5 GHz OTC), as well as signals received thereby for transmission upstream (e.g., via SFP connector/optical modulator to the optical domain, as discussed with respect to FIGS. 7 and 7A). In that chipsets of the type shown in FIG. 7B are readily available and effectively commoditized, they have excellent data bandwidth performance, are readily available at comparatively low cost, and are fully featured in terms of support for various protocols and functions, thereby making them highly useful choices for including with the node 302 (and CPE 308) of the exemplary embodiments of the present disclosure.

Moreover, the presence of the 2.4 GHz band capability enables each node 302 to act as an ad hoc node for e.g., MSO subscribers who happen to be proximate thereto, with no significant added engineering or implementation costs, and using the same form factor of device. For example, a pole-mounted node "pod" may be used in some applications which may also act as "street level free Wi-Fi" for MSO customers (or even others if permitted) within the footprint of the pole pod (whether transiently within the footprint, or permanently there, such as where a business or residence is within 2.4 GHz WLAN range of the pole pod.

Likewise, through simple addition of appropriate cellular antennae, the pod can act as a cellular extender or repeater, which is particularly advantageous in cases where the extant cellular service from an MNO (or unlicensed/quasi-licensed "cellular" offered by the MSO) is poor in that area due to extended range from the closest base station, in dense urban environments where signal propagation may be poor in certain areas, etc.

Exemplary Amplifier Apparatus-

Figure 8:
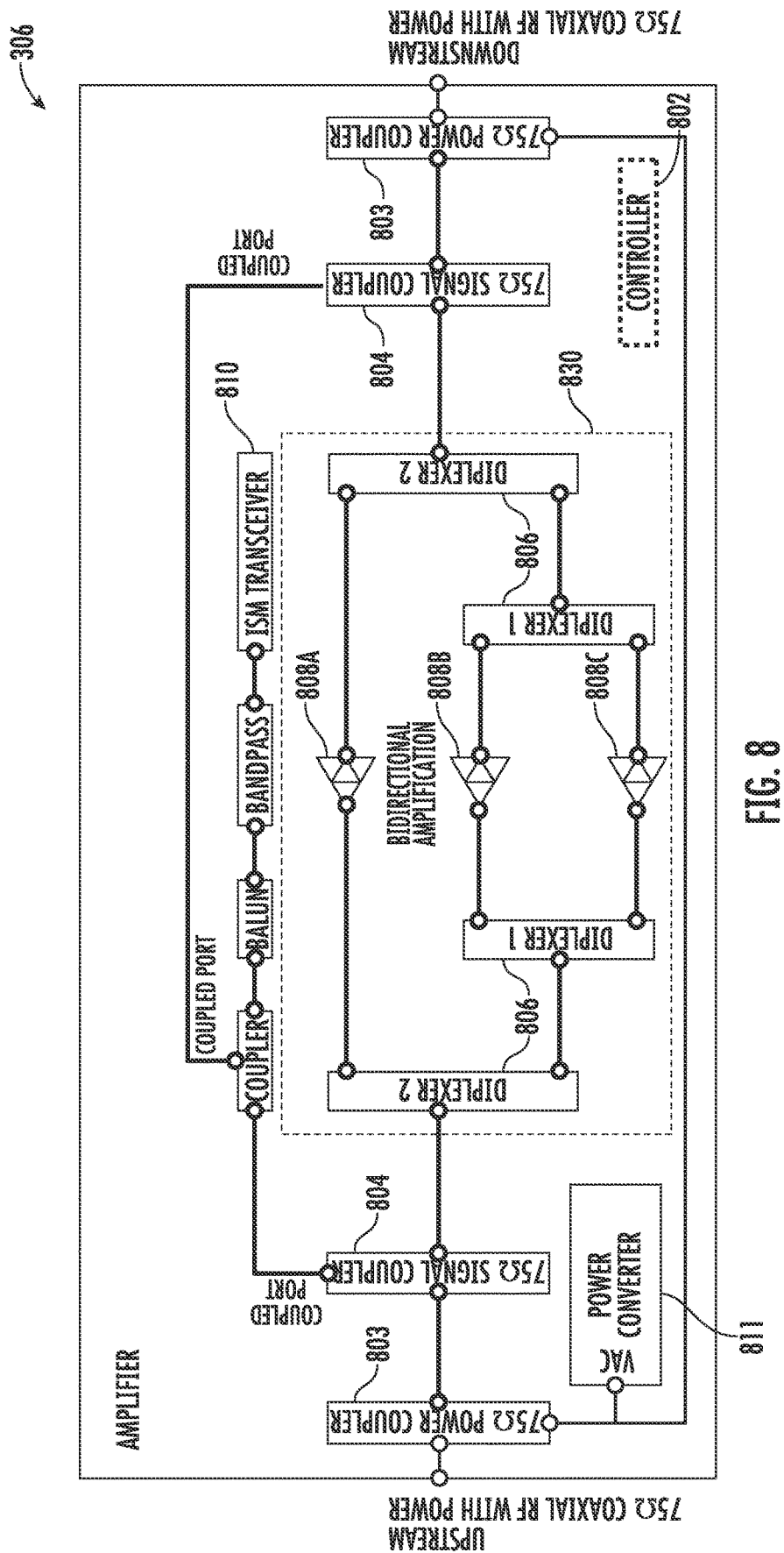
FIG. 8 is a functional block diagram illustrating an exemplary configuration of an amplifier apparatus according to the present disclosure.

FIG. 8 illustrates an exemplary embodiment of an amplifier apparatus 306 configured according to the present disclosure. As shown, the amplifier apparatus 306 includes, inter alia, a controller subsystem 802, 7542 signal and power couplers 803, 804, a plurality of diplexers 806, a plurality of bidirectional amplifiers 808, an ISM transceiver 810, and power converter 811.

In one variant, the couplers 803, 804 extract from the signal received via coaxial cable a power component and data component, where the signal is further processed through diplexers 806 and bidirectional amplifiers 808 to diplex (frequency multiplex) and amplify the signals, respectively. It will be appreciated that the bidirectional amplifiers 808 in the illustrated embodiment of the different signal paths are of different types (e.g., made up of different circuitry) to accommodate the different access schemes of LBT, TDD, and FDD of received signals (which basically must be split out to enable operation unencumbered by the other types of signals). As with the node 302 previously discussed, the diplexers are arranged in a hierarchy or tier structure so as to enable isolation of the constituent signals in the US (and combination in the DS), with amplification of each of the signals via the respective bidirectional amplifiers 808 interposed between the diplexer stage.

In operation, the power coupler(s) enable power extraction for the power converter 811 to power the amplifier 306 (i.e., via rectified AC voltage), while the signal couplers 804 enable asymmetric signal coupling between the ports and the ISM transceiver 810. For example, in one scenario, the transceiver 810 outputs a signal which is bandpass filtered and ultimately coupled to either the upstream or downstream ports (via the respective couplers), or both, so as to permit the ISM signals (e.g., either control data, identifying data, or both) to be transmitted upstream and/or downstream as applicable via the cable plant connected on either end. In one embodiment, the diplexers are configured to filter out any ISM band signals from those signals being injected into the bidirectional amplifiers, and transmitter power and power roll-off from the ISM carrier's band edges due to bandpass filtering of the transmitter are utilized. The ISM transceiver's emission due to filtering can be a very narrow band emission. In one exemplary implementation, a Silicon Laboratories Model Si4432 or similar EZRadioPRO Sub-GHz Wireless integrated circuit wireless transceiver device is used for the foregoing ISM transceiver functions, although it will be appreciated that other devices or configurations may be used consistent with the present disclosure.

In one embodiment, the ISM transceiver 810 is not connected to any bidirectional amplifier, but the signal is transmitted based on the output power of the transceiver (without amplification). In another embodiment, the ISM band signal may be amplified (e.g., via connection to the signal path leading to the appropriate bidirectional amplifier.

In one scenario, the amplifier apparatus 306 receives information communicated via ISM band from another node (e.g., the node 302 upstream of it) and then generates its own message to be communicated via ISM transceiver 810 in order to e.g., add identifying information of the amplifier apparatus 306 itself to that received from the upstream node. This further helps the pinpointing of the location of any RF signal leak discussed herein. In another scenario, the ISM transceiver 810 can encode only its own identifying data (e.g., ASCII characters) into the ISM signal.

Moreover, the ISM transceiver can also be controlled by the local controller process 802 (including control by a network-based controller process such as previously described herein). In one exemplary embodiment, the controller 802 controls the ISM transceiver 810, performs gain control for bidirectional amplifiers 808A, 808B and 808cC, and enables remote observability of the performance of the amplifier(s) by monitoring and reporting the state of the subsystems.

Exemplary CPE Apparatus-

Figure 9:
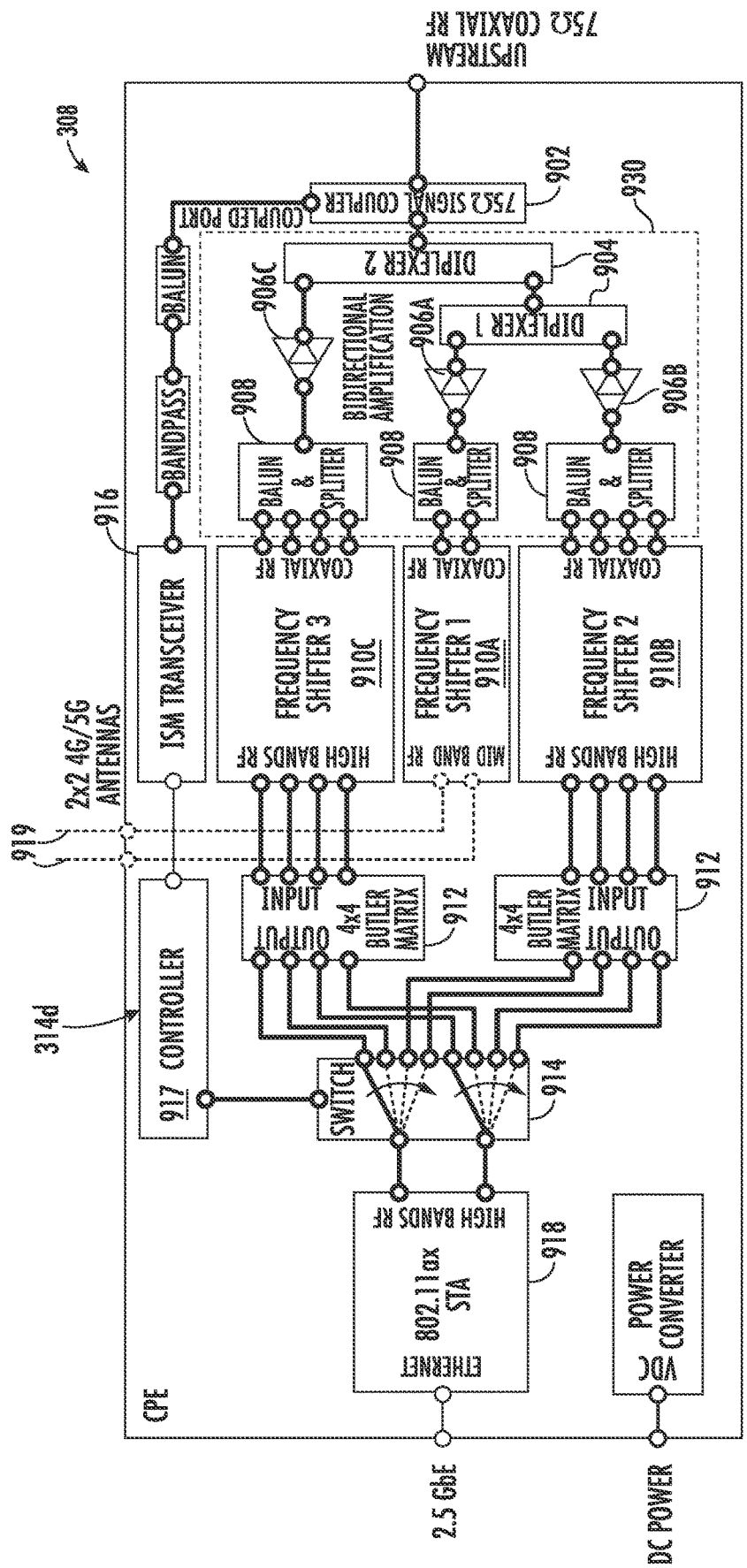
FIG. 9 is a functional block diagram illustrating an exemplary configuration of a CPE apparatus according to the present disclosure.

FIG. 9 illustrates an exemplary embodiment of a CPE 308 configured according to the present disclosure. As shown, the CPE 308 includes, inter alia, a 75-Ω signal coupler 902, a plurality of diplexers 904, a plurality of bidirectional amplifiers 906, a plurality of frequency shifters 910, two (2) 4×4 Butler matrices 912, a switch 914, an ISM transceiver 916, a controller module 917, an 802.11ax STA (station) 918, and 2×2 cellular antennas 919.

In one variant, the coupler 902 is configured to couple the ISM data from the other data encoded in the RF signal (e.g., control data transmitted from an upstream controller process within the designated ISM band 210 on the cable) received by the CPE via coaxial cable in the HFC distribution network. In one implementation, the information received via ISM band as processed by the ISM transceiver 916 comprises information related to controlling the switch(es) 914 so that the information from appropriate combinations of ports from the Butler matrices 912 can be communicated to the 802.11ax STA module 918 for transmission of the data to one or more user devices (e.g., via the GbE port of the CPE). The controller 917 receives the foregoing information from the ISM transceiver 916 and operates or configures the switch 914 accordingly. In one approach, the controller logic 314d of the controller 917 receives real-time data that causes the switches 914 to operate so that the CPE can make use of the appropriate ports of the Butler matrices (i.e., the first switch is coupled to one of the diversity ports of the 802.11ax chipset, and switched between inputs from the second and third frequency shifters 910B, 910C such that each STA/CPE can access either the upper or lower bands as output from the respective frequency shifters.

In another variant, multiple butler matrices 912 (e.g., the number matching the number of Wi-Fi APs configured in an exemplary embodiment of a network node 302) are used to transmit the received data originating from four ports of each of the multiple Wi-Fi modules 708 of a network node 302 to one or more user devices via two ports of Wi-Fi STA 918 of the CPE 308. The foregoing mapping is done with 4×4 butler matrices 912 and a switch 914, which is controlled by controller 917 as discussed supra. This approach allows the CPE 308 to utilize the appropriate number of node AP ports (i.e., since the node AP has four ports or spatial diversity channels, and the commodity STA of the CPE 308 has only two ports/channels). As such, the STA of the CPE can access either band 204, 206 (FIG. 2)

As with the node and amplifier previously discussed, the exemplary embodiment of the CPE 308 uses multiple diplexers in tiers or hierarchy, and multiple bidirectional amplifiers 906 to amplify the different types and bands of signals (e.g., LBT/TDD/FDD), based on the source of the signals. Similarly, multiple frequency shifters 910 are used to convert the foregoing different types of signals to a frequency appropriate for transmission to one or more user devices (e.g., to frequency multiplex the signals into different bands in the DS direction, or combine the various signals onto the cable in their respective bands in the US direction).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating at least a portion of a radio frequency (RF) network so that extant coaxial cable infrastructure is used to deliver broadband data services, the computerized method comprising:
    receiving one or more RF signals via at least one second node of the extant coaxial cable infrastructure, the received one or more RF signals having been transmitted from a first node over at least one portion of the extant coaxial cable infrastructure utilizing at least two frequency bands, the at least two frequency bands comprising at least a first band and a second band, each of the first band and the second band configured for symmetric operation, thereby having upstream (US) and downstream (DS) capability;
    dynamically reallocating at least portions of at least one of the first band or the second band between US and DS directions;
    up-converting the received one or more RF signals via one or more modules to one or more user bands, the one or more user bands associated with the one or more modules; and
    transmitting the up-converted one or more RF signals over at least one of (i) an air interface or (ii) a local area network (LAN), for consumption by a computerized premises device associated with the at least one second node.

2. The computerized method of claim 1, wherein the at least two frequency bands are wider in frequency range than an operating band of the extant coaxial cable infrastructure when used for traditional cable operations.

3. The computerized method of claim 2, wherein the at least two frequency bands further comprises a band at least 1200 MHz in width.

4. The computerized method of claim 2, wherein the first band is at least 600 MHz in width, and the second band is at least 600 MHz in width.

5. The computerized method of claim 4, wherein the at least two frequency bands further comprises an Industrial Scientific Medical (ISM) band at least 10 MHz in width, the ISM band separate from the first band and the second band.

6. The computerized method of claim 1, wherein:
    the up-converting to the one or more user bands comprises up-converting to one or more Third Generation Partnership Project (3GPP) Long Term Evolution (LTE) or Fifth Generation (5G) New Radio (NR) bands; and
    the transmitting comprises transmitting over the air interface, the air interface compliant with 3GPP LTE or 5G NR protocols within the one or more 3GPP LTE or 5G NR bands.

7. The computerized method of claim 1, wherein:
    the up-converting to the one or more user bands comprises up-converting to one or more Citizens Broadband Radio Service (CBRS) unlicensed or quasi-licensed bands; and
    the transmitting comprises transmitting over the air interface, the air interface compliant with Third Generation Partnership Project (3GPP) Long Term Evolution (LTE) or Fifth Generation (5G) New Radio (NR) protocols within the one or more CBRS unlicensed or quasi-licensed bands.

8. Computerized user premises apparatus for use within a hybrid network topology, the computerized user premises apparatus comprising:
  a first port for interfacing with a first portion of the hybrid network topology utilizing at least a network medium for transmission of signals;
  amplification logic in communication with the first port and configured to at least amplify the signals received via the first port;
  frequency shifter apparatus configured to up-convert at least a portion of the amplified signals to a prescribed frequency band;
  at least one radio frequency (RF) integrated circuit (IC) configured to at least receive at least the portion of the up-converted signals within the prescribed frequency band and convert them to data packets consistent with a data networking protocol; and
  switch apparatus configured to switch at least the portion of the up-converted signals to at least two ports of the at least one RF IC, wherein the switch of at least the portion of the up-converted signals to the at least two ports is based on control data received within an Industrial Scientific Medical (ISM) band and via the first port.

9. The computerized user premises apparatus of claim 8, wherein:
  the first port comprises a coaxial cable port, the first portion comprising a coaxial cable distribution plant, and the signals comprising radio frequency (RF) signals; and
  the at least one RF integrated circuit (IC) is configured to at least receive at least the portion of the up-converted signals within the prescribed frequency band and convert at least the portion of the up-converted signals to the data packets consistent with the data networking protocol comprises a chipset configured to receive RF signals within a prescribed wireless local area network (WLAN) frequency band, and to convert at least the portion of the up-converted signals to Ethernet data packets for distribution within a premises via an Ethernet-enabled network interface.

10. The computerized user premises apparatus of claim 9, further comprising:
  at least one second frequency shifter apparatus configured to up-convert at least the portion of the amplified received signals to a prescribed cellular frequency band; and
  antenna apparatus in signal communication with the at least one second frequency shifter apparatus and configured to at least transmit the amplified received signals within the prescribed cellular frequency band within the premises.

11. The computerized user premises apparatus of claim 8, wherein:
  the hybrid network topology comprises a topology having at least one optical fiber portion and at least one coaxial cable portion and at least one wireless portion; and
  the ISM band is utilized to detect RF signal leakage within the hybrid network topology.

12. Computer readable apparatus comprising a non-transitory storage medium, the non-transitory storage medium comprising at least one computer program having a plurality of instructions, the plurality of instructions configured to, when executed on a processing apparatus, cause a computerized apparatus to:
  receive one or more RF waveforms via at least one second node of an extant coaxial cable infrastructure, the received one or more RF waveforms having been transmitted from a first node over at least one portion of the extant coaxial cable infrastructure utilizing at least two frequency bands, the at least two frequency bands comprising at least a first band and a second band, each of the first band and the second band configured for (i) a data rate of up to at least 2.4 Gbps and (ii) symmetric operation, thereby having upstream (US) and downstream (DS) capability;
  dynamically reallocate at least portions of at least one of the first band or the second band in at least one of an US direction or a DS direction;
  up-convert the received one or more RF waveforms via one or more modules to one or more user bands, the one or more user bands associated with the one or more modules; and
  transmit the up-converted one or more RF waveforms over at least one of (i) an air interface or (ii) a local area network (LAN), for consumption by a computerized user device associated with the at least one second node.

13. The computer readable apparatus of claim 12, wherein the computerized apparatus is configured to utilize at least one high-bandwidth chipset and share available bandwidth with at least one other computerized apparatus on a common coaxial cable backhaul, the sharing in accordance with at least a frequency division scheme that is controlled by switching logic associated with a network, a portion of the network comprising the extant coaxial cable infrastructure.

14. The computer readable apparatus of claim 12, wherein:
  the transmission of the up-converted one or more RF waveforms comprises use of a 5-85 MHz band for provision of at least a portion of cellular data service; and
  the computerized apparatus is configured to be as a distributed antenna system (DAS) for at least one of transmission or reception of Third Generation Partnership Project (3GPP) waveforms for a premises via the extant coaxial cable infrastructure serving the premises.

15. The computer readable apparatus of claim 12, wherein the computerized apparatus comprises a matrix apparatus, the matrix apparatus configured to implement at least one of allocation of, or switching between, different signals of one or more premises equipment chipsets.

16. The computer readable apparatus of claim 15, wherein the matrix apparatus comprises Butler matrix logic.

17. The computer readable apparatus of claim 15, wherein the matrix apparatus is controlled by a controller process disposed upstream in a content distribution network from the computerized apparatus.

18. The computer readable apparatus of claim 15, wherein the matrix apparatus is controlled locally by a local controller process operative within the computerized apparatus at a served premises of a content distribution network.

19. The computer readable apparatus of claim 12, wherein:
  the receipt of the one or more RF waveforms via the at least one second node comprises receipt of the one or more RF waveforms via four ports of the computerized network node;

the transmission of the up-converted one or more RF waveforms to the computerized user device comprises transmission of the converted one or more RF waveforms to the computerized user device via two ports of the computerized apparatus; and the computerized apparatus comprises a matrix apparatus, the matrix apparatus configured to map the one or more RF waveforms received via four ports of the at least one second node onto the two ports of the computerized apparatus to enable the transmission of the up-converted one or more RF waveforms to the computerized user device via the two ports.

20. The computer readable apparatus of claim 12, wherein the computerized apparatus comprises a plurality of bidirectional amplifiers configured to at least amplify the received one or more RF waveforms, the plurality of bidirectional amplifiers comprising at least a bidirectional amplifier for a time-division duplex (TDD) carrier and a bidirectional amplifier for a frequency-division duplex (FDD) carrier.

* * * * *